(12) United States Patent
Seo et al.

(10) Patent No.: US 8,676,037 B2
(45) Date of Patent: *Mar. 18, 2014

(54) RECORDING MEDIUM HAVING DATA STRUCTURE FOR MANAGING REPRODUCTION OF STILL PICTURES RECORDED THEREON AND RECORDING AND REPRODUCING METHODS AND APPARATUSES

(75) Inventors: Kang Soo Seo, Anyang-si (KR); Byung Jin Kim, Sungnam-si (KR)

(73) Assignee: LG Electronics, Inc., Seoul (KR)

( * ) Notice: Subject to any disclaimer, the term of this patent is extended or adjusted under 35 U.S.C. 154(b) by 1916 days.

This patent is subject to a terminal disclaimer.

(21) Appl. No.: 11/605,244

(22) Filed: Nov. 29, 2006

(65) Prior Publication Data

US 2009/0028519 A1 Jan. 29, 2009

Related U.S. Application Data

(63) Continuation of application No. 10/759,461, filed on Jan. 20, 2004, now Pat. No. 8,050,538.

(60) Provisional application No. 60/445,425, filed on Feb. 7, 2003.

(30) Foreign Application Priority Data

| | | | |
|---|---|---|---|
| Jan. 20, 2003 | (KR) | ............ | 10-2003-003784 |
| Feb. 14, 2003 | (KR) | ............ | 10-2003-009485 |
| Dec. 1, 2003 | (KR) | ............ | 10-2003-086341 |

(51) Int. Cl.
*H04N 5/92* (2006.01)
*H04N 5/93* (2006.01)
*H04N 9/80* (2006.01)

(52) U.S. Cl.
USPC ............ 386/326; 386/353; 386/343

(58) Field of Classification Search
None
See application file for complete search history.

(56) References Cited

U.S. PATENT DOCUMENTS

| | | | |
|---|---|---|---|
| 5,854,873 A | 12/1998 | Mori et al. | |
| 5,870,523 A | 2/1999 | Kikuchi et al. | |

(Continued)

FOREIGN PATENT DOCUMENTS

| | | |
|---|---|---|
| AU | 6672298 | 9/1998 |
| CN | 1205503 | 1/1999 |

(Continued)

OTHER PUBLICATIONS

Office Action for corresponding Chinese Application No. 200480002392.X dated Nov. 30, 2007.

(Continued)

*Primary Examiner* — William C Vaughn, Jr.
*Assistant Examiner* — Asher Khan
(74) *Attorney, Agent, or Firm* — Harness, Dickey & Pierce, PLC

(57) ABSTRACT

The recording medium includes a data structure with at least one playlist file stored in a playlist area of the recording medium. The playlist file includes at least one playitem, at least one sub-playitem and mark information. The playitem provides navigation information for reproducing at least one still picture from a first file. The sub-playitem is associated with the playitem and provides navigation information for reproducing audio data from a second file. The mark information includes at least one mark pointing to the still picture.

25 Claims, 18 Drawing Sheets

(56) References Cited

U.S. PATENT DOCUMENTS

| | | | |
|---|---|---|---|
| 5,884,004 | A | 3/1999 | Sato et al. |
| 5,999,698 | A | 12/1999 | Nakai et al. |
| 6,122,436 | A | 9/2000 | Okada et al. |
| 6,157,769 | A | 12/2000 | Yoshimura et al. |
| 6,236,656 | B1 | 5/2001 | Westerberg et al. |
| 6,250,928 | B1 | 6/2001 | Poggio et al. |
| 6,266,483 | B1 | 7/2001 | Okada et al. |
| 6,285,826 | B1 | 9/2001 | Murase et al. |
| 6,308,005 | B1 | 10/2001 | Ando et al. |
| 6,341,196 | B1 | 1/2002 | Ando et al. |
| 6,353,702 | B1 | 3/2002 | Ando et al. |
| 6,374,037 | B1 | 4/2002 | Okada et al. |
| 6,385,389 | B1 | 5/2002 | Maruyama et al. |
| 6,393,430 | B1 | 5/2002 | Van Ryzin |
| 6,400,893 | B1 | 6/2002 | Murase et al. |
| 6,424,797 | B1* | 7/2002 | Murase et al. .............. 386/241 |
| 6,442,337 | B1 | 8/2002 | Okada et al. |
| 6,470,460 | B1 | 10/2002 | Kashiwagi et al. |
| 6,493,504 | B1 | 12/2002 | Date et al. |
| 6,532,335 | B2 | 3/2003 | Otomo et al. |
| 6,574,419 | B1 | 6/2003 | Nonomura et al. |
| 6,580,870 | B1 | 6/2003 | Kanazawa et al. |
| 6,594,442 | B1 | 7/2003 | Kageyama et al. |
| 6,771,891 | B1 | 8/2004 | Moon |
| 6,798,976 | B2 | 9/2004 | Tsumagari et al. |
| 6,823,010 | B1 | 11/2004 | Curet et al. |
| 6,829,211 | B2 | 12/2004 | Sako et al. |
| 6,856,756 | B1 | 2/2005 | Mochizuki et al. |
| 6,943,684 | B2 | 9/2005 | Berry |
| 6,999,674 | B1 | 2/2006 | Hamada et al. |
| 7,054,545 | B2 | 5/2006 | Ando et al. |
| 7,224,890 | B2 | 5/2007 | Kato |
| 7,477,833 | B2 | 1/2009 | Kato et al. |
| 7,684,675 | B2 | 3/2010 | Seo et al. |
| 2001/0000809 | A1 | 5/2001 | Ando et al. |
| 2001/0016112 | A1 | 8/2001 | Heo et al. |
| 2001/0017975 | A1 | 8/2001 | Ando et al. |
| 2001/0043790 | A1 | 11/2001 | Saeki et al. |
| 2001/0046371 | A1* | 11/2001 | Ando et al. .............. 386/70 |
| 2001/0056580 | A1 | 12/2001 | Seo et al. |
| 2002/0006165 | A1 | 1/2002 | Kato |
| 2002/0035575 | A1 | 3/2002 | Taira et al. |
| 2002/0048228 | A1 | 4/2002 | Sako et al. |
| 2002/0085022 | A1 | 7/2002 | Masuda et al. |
| 2002/0110369 | A1 | 8/2002 | Mori et al. |
| 2002/0126994 | A1 | 9/2002 | Gunji et al. |
| 2002/0127001 | A1 | 9/2002 | Gunji et al. |
| 2002/0130896 | A1 | 9/2002 | Spence et al. |
| 2002/0135607 | A1 | 9/2002 | Kato et al. |
| 2002/0135608 | A1 | 9/2002 | Hamada et al. |
| 2002/0145702 | A1 | 10/2002 | Kato et al. |
| 2002/0164152 | A1* | 11/2002 | Kato et al. .............. 386/95 |
| 2002/0172496 | A1 | 11/2002 | Gunji et al. |
| 2003/0014760 | A1 | 1/2003 | Yamauchi et al. |
| 2003/0165328 | A1 | 9/2003 | Grecia |
| 2003/0235406 | A1 | 12/2003 | Seo et al. |
| 2004/0001704 | A1 | 1/2004 | Chan et al. |
| 2004/0057700 | A1 | 3/2004 | Okada et al. |
| 2004/0081434 | A1 | 4/2004 | Jung et al. |
| 2004/0141436 | A1 | 7/2004 | Monahan |
| 2004/0179820 | A1 | 9/2004 | Kashiwagi et al. |
| 2004/0184780 | A1 | 9/2004 | Seo et al. |
| 2004/0213552 | A1 | 10/2004 | Kato |
| 2005/0019007 | A1 | 1/2005 | Kato et al. |
| 2005/0105888 | A1 | 5/2005 | Hamada et al. |
| 2005/0163463 | A1 | 7/2005 | Schick et al. |
| 2005/0196143 | A1 | 9/2005 | Kato et al. |
| 2005/0201718 | A1 | 9/2005 | Kato |
| 2005/0254363 | A1 | 11/2005 | Hamada et al. |
| 2006/0036960 | A1 | 2/2006 | Loui |
| 2006/0188223 | A1 | 8/2006 | Ikeda et al. |
| 2006/0195633 | A1 | 8/2006 | Plourde, Jr. |
| 2008/0166067 | A1* | 7/2008 | Roth et al. .............. 382/299 |

FOREIGN PATENT DOCUMENTS

| | | |
|---|---|---|
| CN | 1240293 | 1/2000 |
| CN | 1263672 | 8/2000 |
| CN | 1063863 | 3/2001 |
| CN | 1301445 | 6/2001 |
| CN | 1303094 | 7/2001 |
| CN | 1304533 | 7/2001 |
| CN | 1357888 | 7/2002 |
| CN | 1381137 | 11/2002 |
| DE | 69907758 | 2/2004 |
| DE | 60002774 | 3/2004 |
| EP | 0856849 | 8/1998 |
| EP | 0949825 | 10/1999 |
| EP | 0978994 | 2/2000 |
| EP | 1041566 | 10/2000 |
| EP | 1045393 | 10/2000 |
| EP | 1103974 | 5/2001 |
| EP | 1113439 | 7/2001 |
| EP | 1128386 | 8/2001 |
| EP | 0942609 | 10/2001 |
| EP | 1 198 133 | 4/2002 |
| EP | 1204269 | 5/2002 |
| EP | 1300851 | 4/2003 |
| FR | 2581771 | 11/1986 |
| GB | 2119151 | 11/1983 |
| JP | 1-300777 | 12/1989 |
| JP | 06-311481 | 11/1994 |
| JP | 07-57436 | 3/1995 |
| JP | 07-262646 | 10/1995 |
| JP | 09-017101 | 1/1997 |
| JP | 10-154373 | 6/1998 |
| JP | 2000-004421 | 1/2000 |
| JP | 2000-020554 | 1/2000 |
| JP | 2000-041212 | 2/2000 |
| JP | 2000-059714 | 2/2000 |
| JP | 2000-333126 | 11/2000 |
| JP | 2001-052467 | 2/2001 |
| JP | 2001-069460 | 3/2001 |
| JP | 2001-078123 | 3/2001 |
| JP | 2001-086458 | 3/2001 |
| JP | 2001-103417 | 4/2001 |
| JP | 2001-155466 | 6/2001 |
| JP | 2001-157155 | 6/2001 |
| JP | 2001-167529 | 6/2001 |
| JP | 2001-216739 | 8/2001 |
| JP | 2001-231015 | 8/2001 |
| JP | 2001-285772 | 10/2001 |
| JP | 2002-082684 | 3/2002 |
| JP | 2002-0158972 | 5/2002 |
| JP | 2002-208258 | 7/2002 |
| JP | 2002-325221 | 11/2002 |
| JP | 2002-354424 | 12/2002 |
| JP | 2003-006979 | 1/2003 |
| JP | 2003-16764 | 1/2003 |
| JP | 2003-045154 | 2/2003 |
| JP | 2003-299015 | 10/2003 |
| JP | 2004-336566 | 11/2004 |
| KR | 1998-0086030 | 12/1998 |
| KR | 1999-0070106 | 9/1999 |
| KR | 10-2000-0002840 | 1/2000 |
| KR | 10-2000-0002921 | 1/2000 |
| KR | 10-2000-0002922 | 1/2000 |
| KR | 10-2000-0014419 | 3/2000 |
| KR | 10-2000-0018987 | 4/2000 |
| KR | 10-2001-0013565 | 2/2001 |
| KR | 10-2001-0021485 | 3/2001 |
| KR | 10-2001-0027114 | 4/2001 |
| KR | 10-2001-0051295 | 6/2001 |
| KR | 10-2001-0066211 | 7/2001 |
| KR | 10-2002-0021402 | 3/2002 |
| KR | 10-2002-0064463 | 8/2002 |
| KR | 10-2003-0064546 | 8/2003 |
| TW | 517495 | 1/2003 |
| WO | WO 98/37699 | 8/1998 |
| WO | WO 99/53694 | 10/1999 |
| WO | WO 00/33532 | 6/2000 |
| WO | WO 00/55857 | 9/2000 |
| WO | WO 00/60598 | 10/2000 |

(56) References Cited

FOREIGN PATENT DOCUMENTS

| | | |
|---|---|---|
| WO | WO 01/82608 A1 | 11/2001 |
| WO | WO 02/062061 A1 | 8/2002 |
| WO | WO 2004/023234 | 3/2004 |
| WO | WO 2004/023484 | 3/2004 |
| WO | WO 2004/023485 | 3/2004 |
| WO | WO 2004/047104 | 6/2004 |
| WO | WO 2004/066281 | 8/2004 |
| WO | WO 2004/075194 | 9/2004 |
| WO | WO 2004/086396 | 10/2004 |

OTHER PUBLICATIONS

Japanese Office Action dated Feb. 16, 2010 for corresponding Japanese Application No. 2008-318105.
United States Office Action dated Jan. 29, 2010 for corresponding U.S. Appl. No. 10/759,461.
U.S. Office Action dated Mar. 1, 2011 for U.S. Appl. No. 10/766,239.
European Telecommunications Standards Institute, "*Digital Video Broadcasting (DVB): Subtitling systems*", 1997, pp. 1-45.
United States Office Action dated Apr. 1, 2010 for corresponding U.S. Appl. No. 10/766,239.
United States Office Action dated Nov. 25, 2009.
Office Action for corresponding Japanese application dated May 20, 2008.
Canadian Office Action dated Jun. 28, 2011 for Application 2,515,950.
United States Office Action dated May 29, 2008.
United States Office Action dated Jun. 2, 2008.
Japanese Office Action dated May 20, 2008.
European Office Action dated May 16, 2008.
Office Action dated Jul. 2, 2010, in corresponding U.S. Appl. No. 10/759,461.
Canadian Office Action dated Jul. 6, 2011 for Application 2,513,666.
Japanese Office Action dated Jun. 20, 2008.
Japanese Office Action dated Jun. 10, 2008.
United States Office Action dated Jul. 9, 2008.
"Information technology—Generic coding of moving pictures and associated audio information: Systems," International Standard, Second Edition, ISO/IEC 13818-1, 2000(E).
Japanese Office Action dated Sep. 24, 2008.
European Search Report dated Jul. 30, 2008.
European Search Report dated Sep. 1, 2008.
Canadian Office Action dated Oct. 1, 2010 in corresponding Canadian Application No. 2512844.
Japanese Office Action dated Sep. 16, 2008.
Chinese Office Action dated Aug. 8, 2008 with English translation.
PCT International Search Report dated Aug. 23, 2004.
Canadian Office Action dated Nov. 8, 2010 in corresponding Canadian Application No. 2513666.
Office Action for corresponding U.S. Appl. No. 10/759,461 dated Feb. 1, 2011.
Korean Office Action dated May 17, 2010 for corresponding Korean Application No. 10-2005-7013392.
U.S. Office Action dated Dec. 5, 2012 for related U.S. Appl. No. 12/656,133.

\* cited by examiner

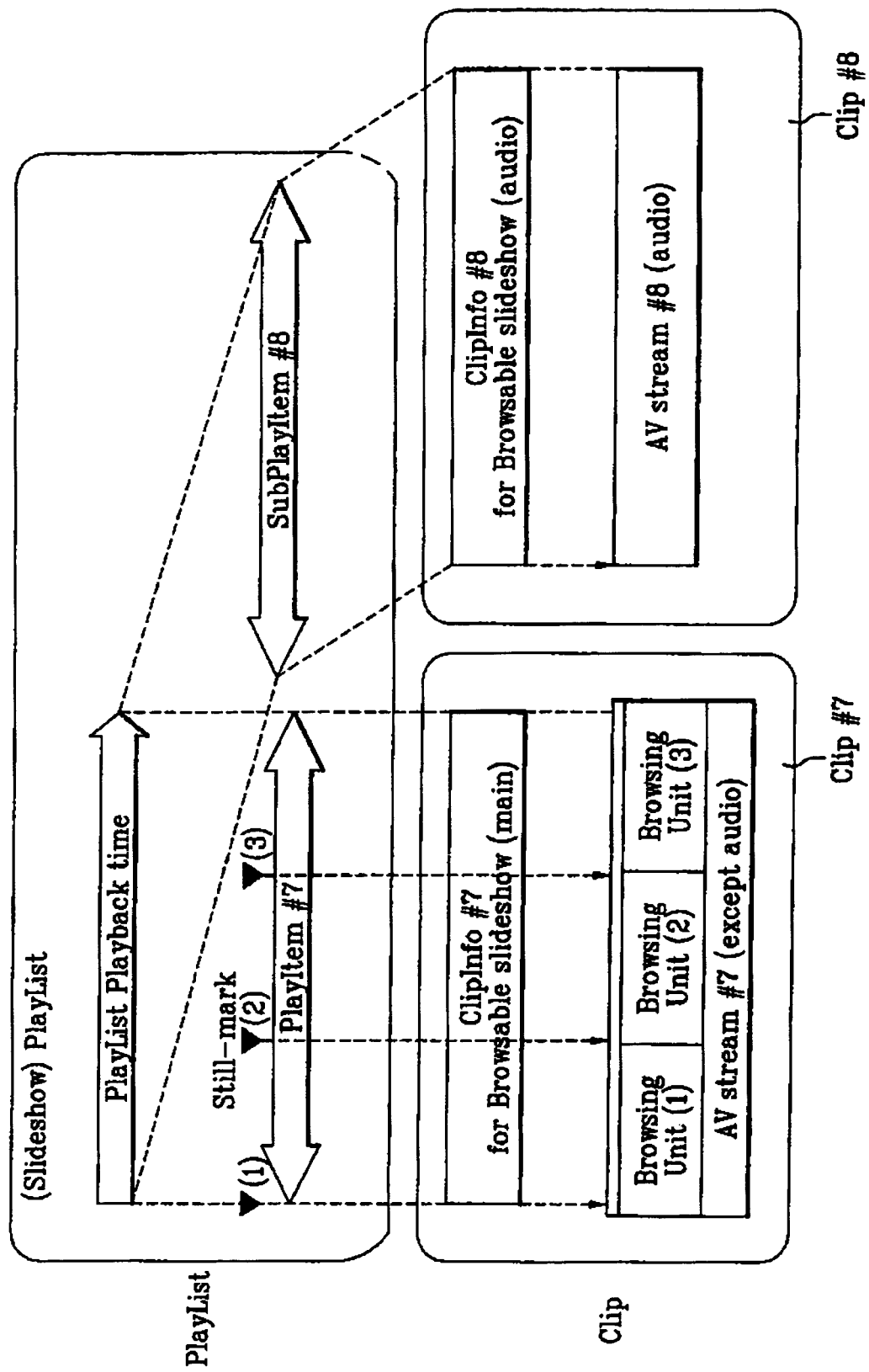

US 8,676,037 B2

RECORDING MEDIUM HAVING DATA STRUCTURE FOR MANAGING REPRODUCTION OF STILL PICTURES RECORDED THEREON AND RECORDING AND REPRODUCING METHODS AND APPARATUSES

PRIORITY INFORMATION

This application is a continuation of U.S. patent application Ser. No. 10/759,461 filed on Jan. 20, 2004, the entirety of which hereby is incorporated herein by reference.

BACKGROUND OF THE INVENTION

1. Field of the Invention

The present invention relates to a recording medium having a data structure for managing reproduction of at least still pictures recorded thereon as well as methods and apparatuses for reproduction and recording.

2. Description of the Related Art

The standardization of new high-density read only and rewritable optical disks capable of recording large amounts of high-quality video and audio data has been progressing rapidly and new optical disk related products are expected to be commercially available in the near future. The Blu-ray Disc Rewritable (BD-RE) and Blu-ray Disk ROM (BD-ROM) are examples of these new optical disks.

While the standard for BD-RE has been published, the standardization for high-density read-only optical disks such as the Blu-ray ROM (BD-ROM) is still under way. Consequently, an effective data structure for managing reproduction of still pictures recorded on the high-density read-only optical disk such as a BD-ROM is not yet available.

SUMMARY OF THE INVENTION

The recording medium according to the present invention includes a data structure for managing reproduction of at least still pictures recorded on the recording medium.

In one exemplary embodiment, a playlist area stores at least one playlist file, and the playlist file includes at least one playitem, at least one sub-playitem and mark information. The playitem provides navigation information for reproducing at least one still picture from a first file. The sub-playitem is associated with the playitem and provides navigation information for reproducing audio data from a second file. The mark information includes at least one mark pointing to the still picture.

In another exemplary embodiment, the recording medium includes a data area and a playlist area. The data area stores at least one clip file, and the clip file includes presentation data. The presentation data includes at least one still picture and related data associated with the still picture. The playlist area stores at least one playlist file, and the playlist file includes playlist mark information. The playlist mark information including at least one mark pointing to the still picture.

In the above-described embodiments, the mark may include a mark type indicator indicating that the mark is of a type used for pointing to a still picture.

Also, in the above-described embodiments, the mark may include a mark type indicator indicating that the mark is of a type that provides a point to skip to when displaying a slide-show of still pictures.

The present invention further provides apparatuses and methods for recording and reproducing the data structure according to the present invention, and recording and reproducing slide shows according to the present invention.

BRIEF DESCRIPTION OF THE DRAWINGS

The above features and other advantages of the present invention will be more clearly understood from the following detailed description taken in conjunction with the accompanying drawings, in which:

FIGS. 15A, 15B and 16 illustrate examples of the data structure for managing reproduction of still images for slideshows.

DESCRIPTION OF THE EMBODIMENTS

In order that the invention may be fully understood, exemplary embodiments thereof will now be described with reference to the accompanying drawings.

Figure 1:
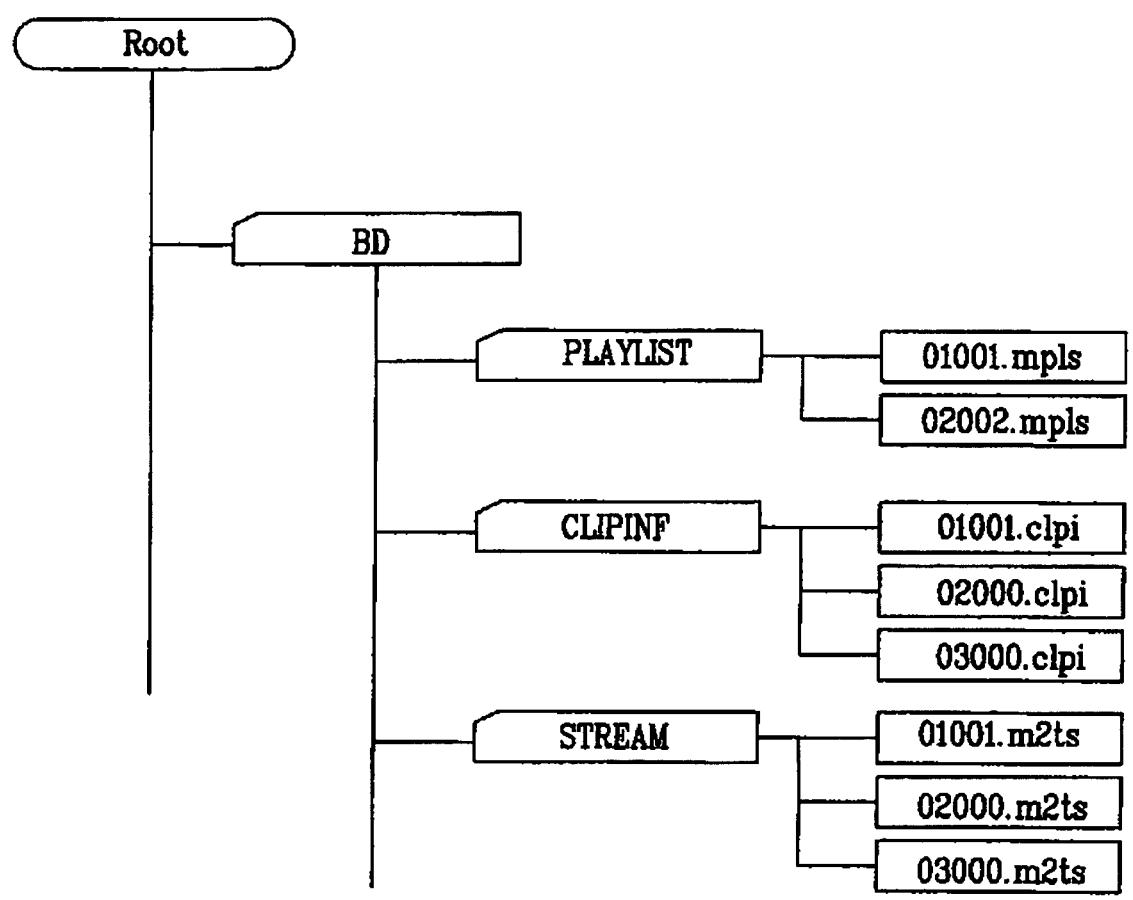
FIG. 1 illustrates an exemplary embodiment of a recording medium file or data structure according to the present invention.

A high-density recording medium such as a high density optical disk, for example, a Blu-Ray ROM (BD-ROM), BD-RE, etc. in accordance with the invention may have a file or data structure for managing reproduction of video and audio data as shown in FIG. 1. Some aspects of the data structure according to the present invention shown in FIG. 1 are the same as the well-known BD-RE standard, as such these aspects will be reviewed, but not described in great detail.

As shown in FIG. 1, the root directory contains at least one BD directory. The BD directory includes general files (not shown), a PLAYLIST directory in which playlist files (e.g., *.mpls) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes MPEG2-formatted A/V stream files called clip streams files or just clip files. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number). The presentation time stamp (PTS) and the source packet number (SPN) are related to an entry point in the AV stream; namely, the PTS and its related SPN point to an entry point on the AV stream. The packet pointed to is often referred to as the entry point packet.

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip file (e.g., presentation time stamps on an ATC or STC basis). The playlist file may also include sub-playitems that also provide a pair of IN-point and OUT-point that point to positions on a time axis of a clip file. Expressed another way, the playlist file identifies playitems and sub-playitems, each playitem or sub-playitem points to a clip file or portion thereof and identifies the clip information file associated with the clip file. The clip information file is used, among other things, to map the playitems to the clip file of source packets. Playlists may also include playlist marks which point to specific places (e.g., a specific address) in a clip file The general information files (not shown) provide general information for managing the reproduction of the A/V streams recorded on the optical disk.

Figure 2:
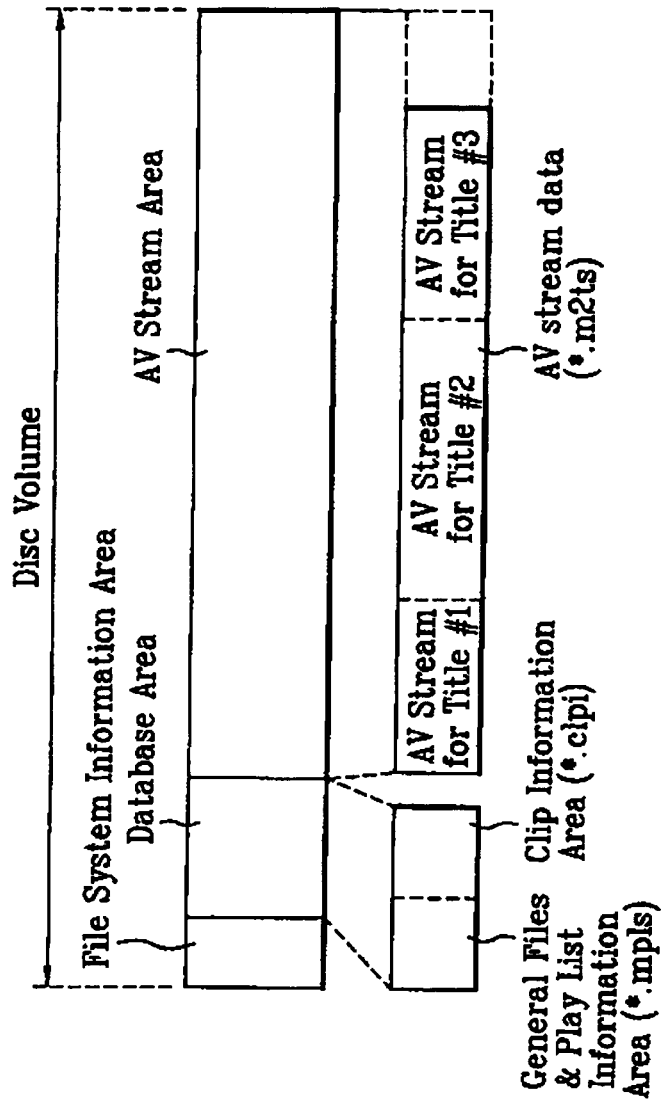
FIG. 2 illustrates an example of a recording medium having the data structure of FIG. 1 stored thereon.

In addition to illustrating the data structure of the recording medium according to an embodiment of the present invention, FIG. 1 represents the areas of the recording medium. For example, the general information files are recorded in one or more general information areas, the playlist directory is recorded in one or more playlist directory areas, each playlist in a playlist directory is recorded in one or more playlist areas of the recording medium, etc. FIG. 2 illustrates an example of a recording medium having the data structure of FIG. 1 stored thereon. As shown, the recording medium includes a file system information area, a data base area and an A/V stream area. The data base area includes a general information file and playlist information area and a clip information area. The general information file and playlist information area have the general information files recorded in a general information file area thereof, and the PLAYLIST directory and playlist files recorded in a playlist information area thereof. The clip information area has the CLIPINFO directory and associated clip information files recorded therein. The A/V stream area has the A/V streams for the various titles recorded therein.

Video and audio data are typically organized as individual titles; for example, different movies represented by the video and audio data are organized as different titles. Furthermore, a title may be organized into individual chapters in much the same way a book is often organized into chapters.

Because of the large storage capacity of the newer, high-density recording media such as BD-ROM and BD-RE optical disks, different titles, various versions of a title or portions of a title may be recorded, and therefore, reproduced from the recording media. For example, video data representing different camera angles may be recorded on the recording medium. As another example, versions of title or portions thereof associated with different languages may be recorded on the recording medium. As a still further example, a director's version and a theatrical version of a title may be recorded on the recording medium. Or, an adult version, young adult version and young child version (i.e., different parental control versions) of a title or portions of a title may be recorded on the recording medium. Each version, camera angle, etc. represents a different reproduction path, and the video data in these instances is referred to as multiple reproduction path video data.

Because of the large storage capacity of the newer, high-density recording media such as BD-ROM still images or pictures may be recorded and reproduced in an organized and/or user interactive fashion, for example, as slideshows. The data structure for managing reproduction of still pictures for a high-density recording medium in accordance with embodiments of the present invention will be described along with methods and apparatuses according to embodiments of the present invention for recording and reproducing still images.

Figure 3:
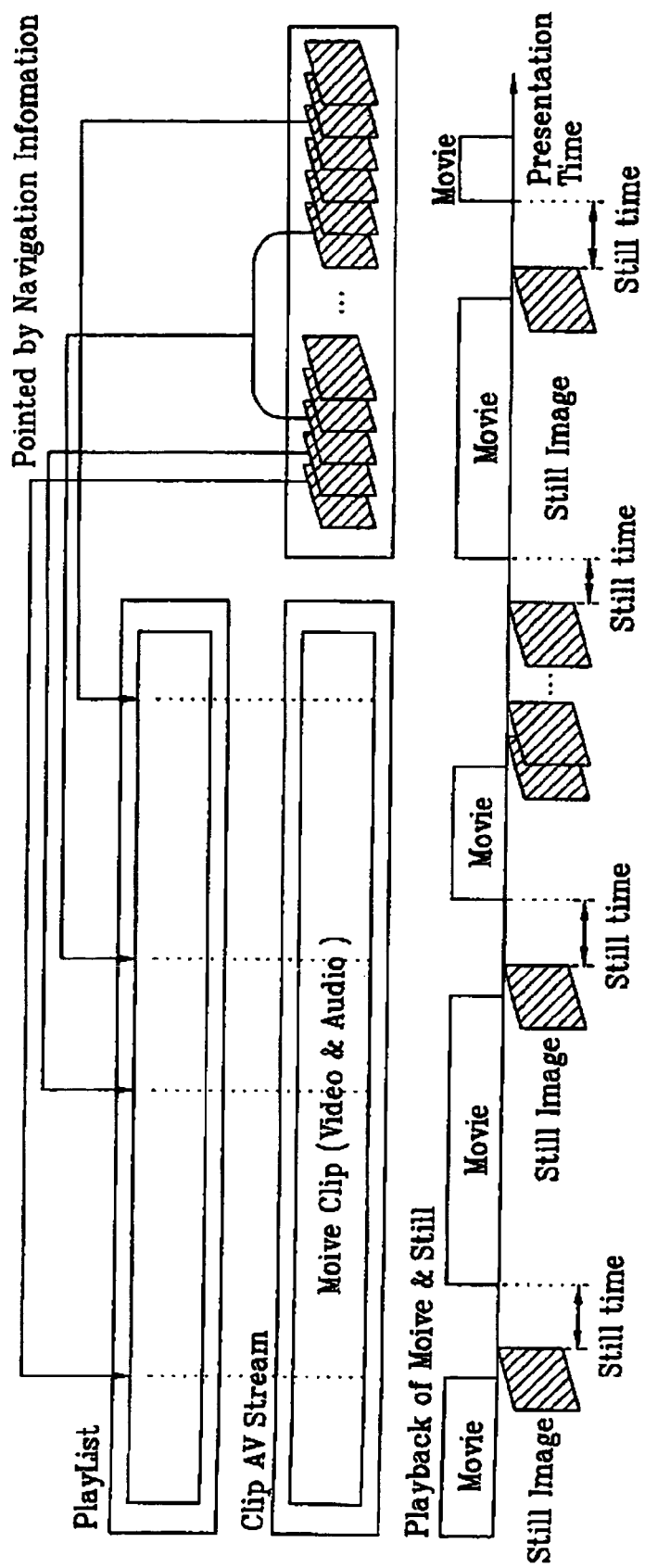
FIG. 3 illustrates a detailed embodiment of portions of the data structure in FIG. 1 and method of managing still images for a high-density recording medium.

FIG. 3 illustrates an embodiment of a data structure and method of managing still images for a high-density recording medium in accordance with the invention. A plurality of still images or pictures are stored in an individual still image file on a high-density recording medium, such as a BD-ROM, and a playlist includes navigation information for playback control of the still images.

The navigation information of the playlist is also associated with movie video or audio data recorded in a particular area of a clip A/V stream. The playlist indicates at what points in the movie video or audio data to reproduce a still picture. Namely, the playlist links the clip A/V stream with the still image file. The playlist may also provide a duration for displaying each still picture, or this information may be supplied by a clip information file. The duration may be finite or infinite.

When, based on reproduction of the playlist, a reproducing apparatus finds that a still image is associated with movie video or audio data during reproduction of the movie video or audio data, the reproducing apparatus obtains the still image from the still image file. The reproducing apparatus then performs a still operation to display the still image for a limited duration or indefinitely based on the presentation duration information for the still image. When an indefinite duration is indicated, the still picture is displayed until user input is received.

As will be appreciated from the above and following disclosure, still images may be displayed as a sequential slideshow, a random/shuffle slideshow, or a browsable slideshow. A sequential slideshow involves the reproduction of still images having limited duration in the order set forth by the playlist. This reproduction of the still images may also occur in synchronized reproduction with audio data. A browsable slide show involves reproduction of still images having infinite duration in an order set forth by the playlist. Reproduction proceeds to a previous or subsequent still image based on user input. A random/shuffle slideshow is a form of sequential or browsable slideshow in which the order to reproduce the still images is randomized.

Figure 4:
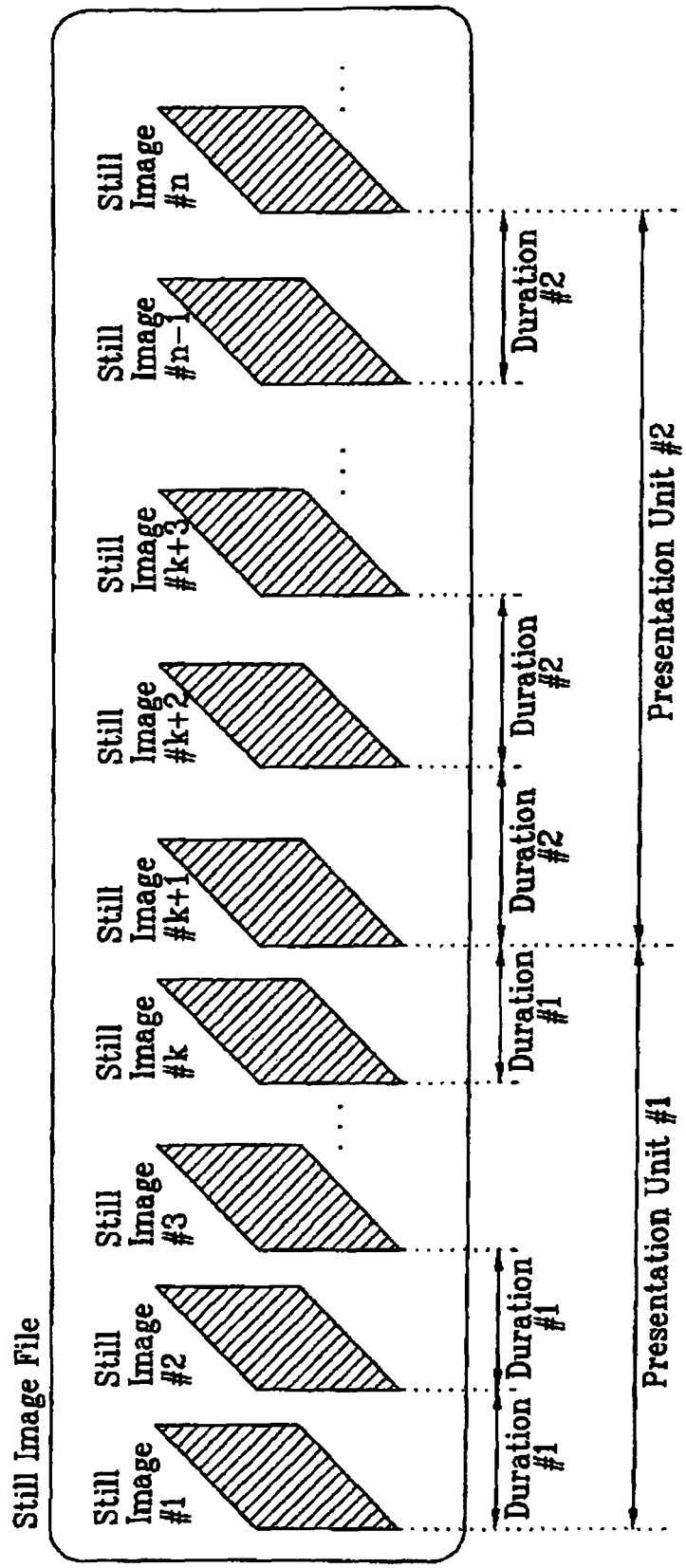
FIG. 4 illustrates one example of a still image file.

FIG. 4 illustrates one example of a still image file. In this example, a still image or a group of still images form a presentation unit. A presentation unit may be formed, for example, of still images having a common presentation attribute. For example in FIG. 4, still images #1~#k that have the same presentation duration (duration #1) are grouped into presentation unit #1 and still images #k+1~#n that have the same presentation duration (duration #2) are grouped into presentation unit #2. While duration has been given as an example of a presentation attribute, it will be understood that the present invention is not limited to this example.

Figure 5:
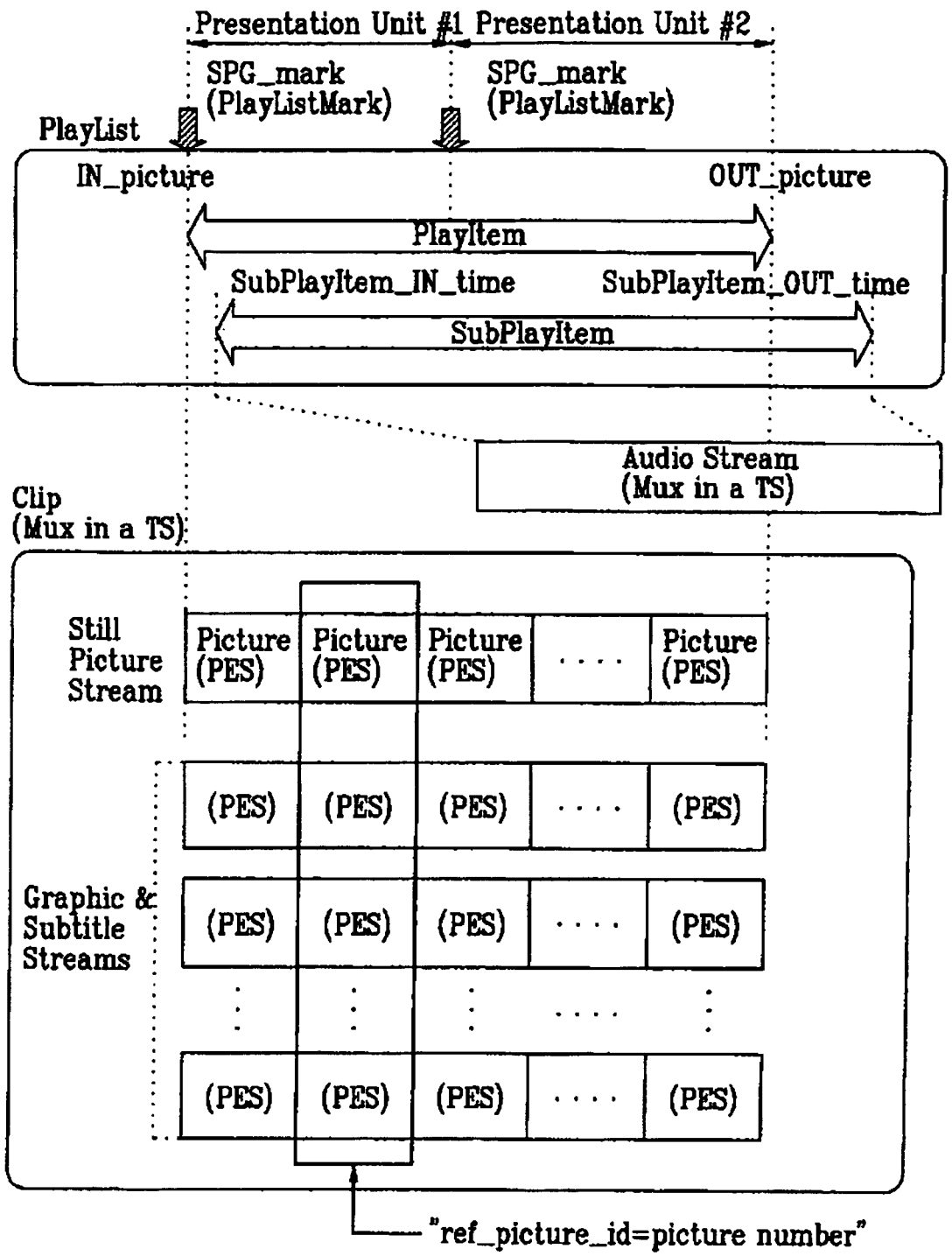
FIG. 5 illustrates an example of the relationship between a playlist and at least one clip file according to an embodiment of the present invention.

FIG. 5 illustrates an example of the relationship between a playlist and at least one clip file according to an embodiment of the present invention. As shown in FIG. 5, the playlist includes navigation information for playback control of a first and second presentation unit (e.g., the first and second presentation unit illustrated in FIG. 4). A playitem included in the playlist is used for playback control of a still picture stream and related data such as graphic & subtitle streams. A sub-playitem included in the playlist is used for playback control of audio data associated with the still image. As shown, the audio data is recorded in a separate file from the still picture and related data, and is therefore not included in the related data. The audio data may be reproduced in either a synchronized or unsynchronized fashion with the associated still images.

The playlist also includes a playlist mark, called hereinafter a still picture group mark (SPG_mark), for each of the presentation units. A still picture group mark SPG_mark points to the beginning of a presentation unit, which includes one or more still images.

The still picture stream and the related data streams (e.g., the graphic & subtitle streams) are packetized into Packetized Elementary Stream (PES) packets on a still image basis. Namely, each PES packet of the still picture stream includes a single still picture. The PES packets are encoded into MPEG2 transport packets and then multiplexed into a transport stream. This will be described in greater detail with respect to the embodiment of FIGS. 6 and 7.

Navigation information for linked reproduction of a still image and graphic & subtitle data associated with the still image is recorded in the PES packets of the still image and the associated graphic & subtitle data. As shown in FIG. 5, a unique picture ID corresponding to the picture number of a still image may be included in the PES packet of the still image and the PES packets of the associated graphic & subtitle.

A reproducing apparatus may effectively perform playback control of still images of presentation units grouped using the still picture group marks (SPG_marks) included in the playlist. Also, the reproducing apparatus performs linked playback of a still image and graphic & subtitle associated with the still image by detecting the unique picture ID of the still image. During reproduction of the still pictures and related data, the reproducing apparatus further reproduces an audio stream indicated by the sub-playitem.

Figure 6:
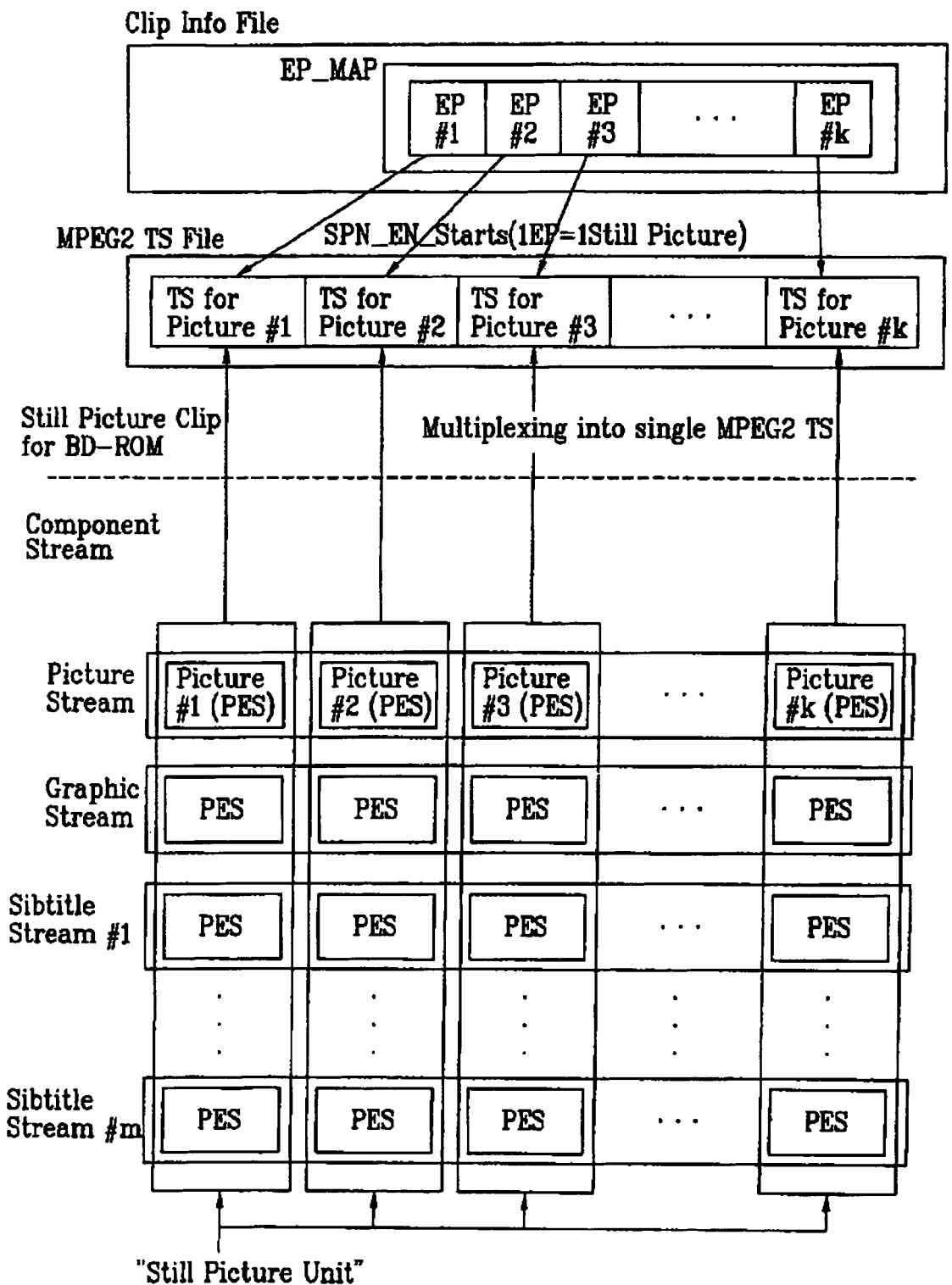
FIGS. 6 and 7 illustrate a detailed embodiment of portions of the data structure in FIG. 1 and a method for managing still images of a high-density recording medium according to the present invention.
Figure 7:
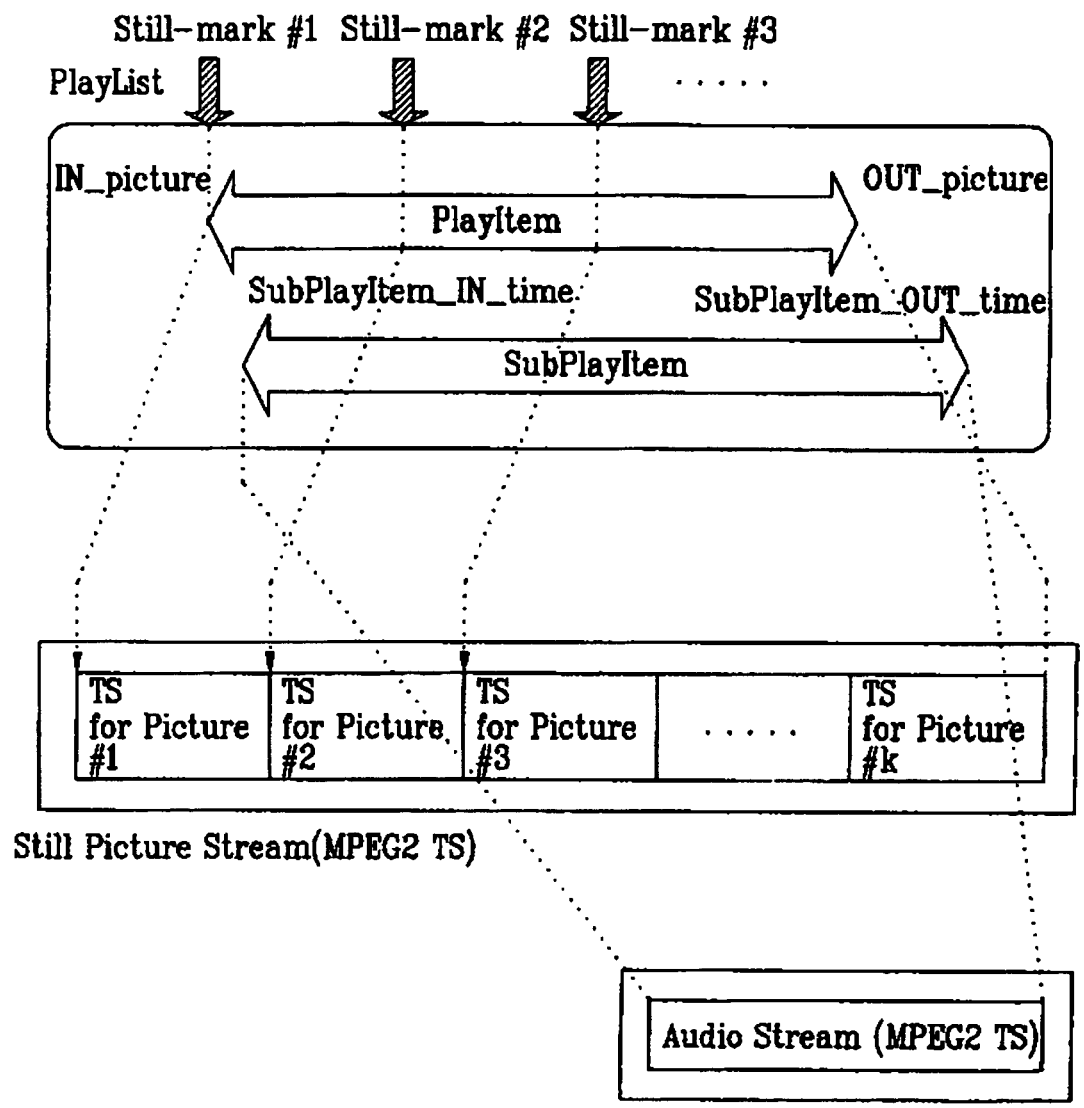

FIGS. 6 and 7 illustrate an embodiment of a data structure and method for managing still images of a high-density recording medium such as a BD-ROM similar to that described above with respect to FIG. 5. The most notable difference being that the embodiment of FIGS. 6 and 7 does not include presentation units.

As shown in FIG. 6, the still picture stream and the related data streams (e.g., the graphic & subtitle streams) are packetized into PES packets on a still image basis. Namely, each PES packet of the still picture stream includes a single still picture, and the associated PES packets of the related data include the related data associated with the still picture (e.g., for reproduction in synchronization with the associated still picture). The still picture together with related data to be reproduced in synchronization therewith are grouped into a still picture unit. On a still picture unit basis, the still picture stream and related data streams are multiplexed into a still picture file of MPEG2 transport streams.

FIG. 6 further shows a clip information file corresponding to the still picture file. The clip information file includes an entry point map (EP_MAP). Individual entry points (EP #1~#k) in the EP map contain respective navigation information for accessing a head recording position of a corresponding still picture unit. The navigation information, for example, includes source packet number entry point start (SPN_EP_Start) information indicating the start recording position of the corresponding still picture unit.

FIG. 7 illustrates a playlist for play control of the still picture file discussed above with respect to FIG. 6. As shown, a playitem (PlayItem) in the playlist contains in-picture (IN_picture) information and out-picture (OUT_picture) information corresponding respectively to the start position and end position of the still images in the still picture file to reproduce. A sub-playitem (SubPlayItem) in the playlist contains sub-playitem in-time (SubPlayItem_IN_time) information and sub-playitem out-time (SubPlayItem_OUT_time) information for a separate audio file to be reproduced in association with the still picture file. The audio data may be reproduced in either a synchronized or unsynchronized fashion with the associated still images.

The playlist further includes a playlist mark, referred to hereinafter as still mark, pointing to each still picture. The presentation duration information for the still picture and related data included in a still picture unit may be recorded in the still mark corresponding to the still picture unit. Alternatively or additionally, the presentation duration information may be contained in the playitem.

The still marks are particularly useful when skipping between pictures during a browsable slideshow. It will further be appreciated that the still picture file or portions thereof can be simultaneously associated with a number of playlists with presentation durations different from each other.

Figure 8:
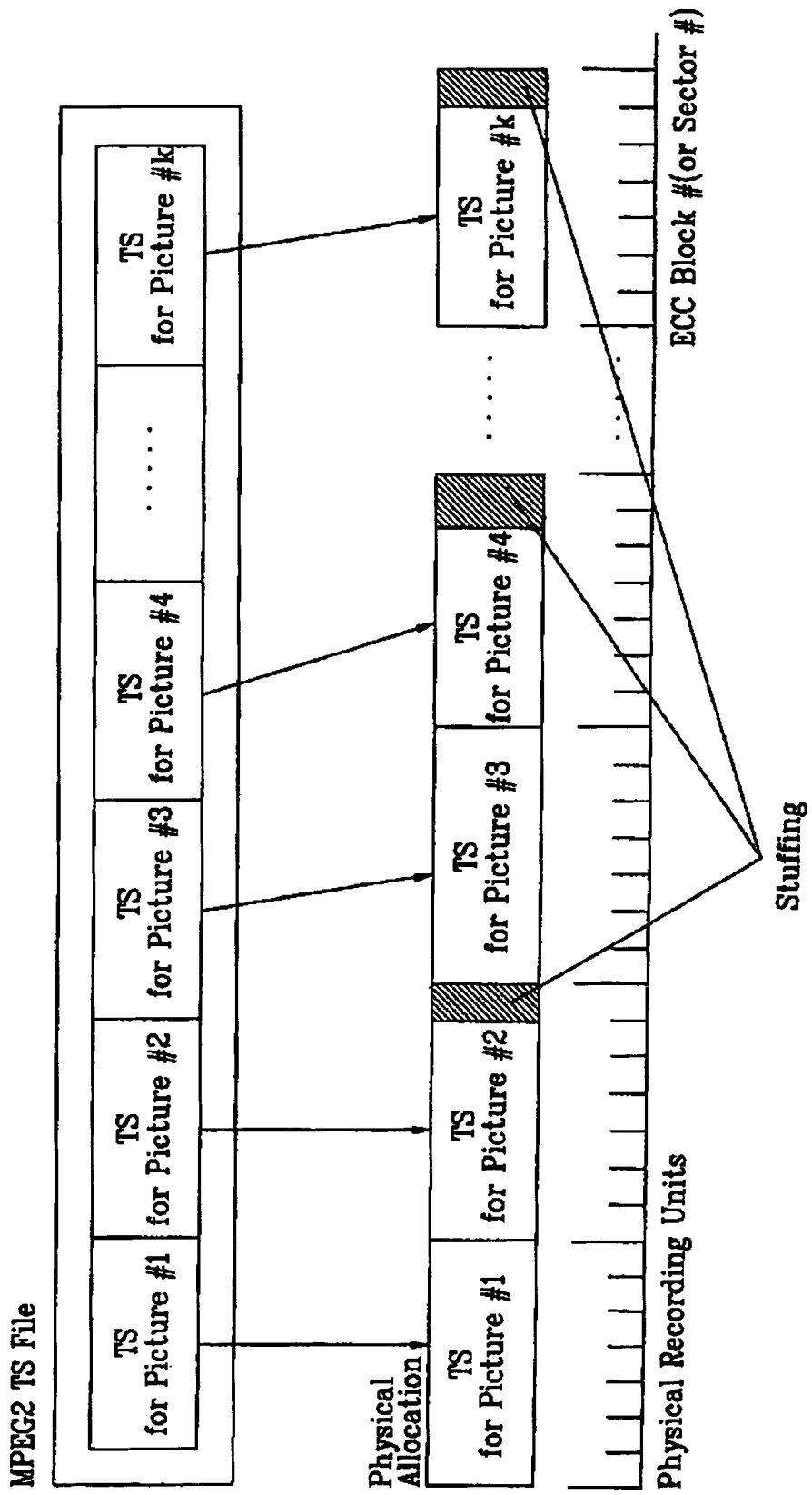
FIG. 8 illustrates physical allocation of transport streams including still picture on a high-density optical disk recording medium.

FIG. 8 illustrates the physical allocation of the MPEG2 transport stream on, for example, an optical disk. As shown, each portion of the MPEG2 transport stream corresponding to a still picture unit is recorded in alignment with a physical recording unit, such as an error correction code block (ECC Block) unit or sector unit, of the optical disk. For example, if the recording size of the transport stream corresponding to a second still picture unit does not fill the physical recording unit, the unfilled region is filled or stuffed with null data.

Figure 9:
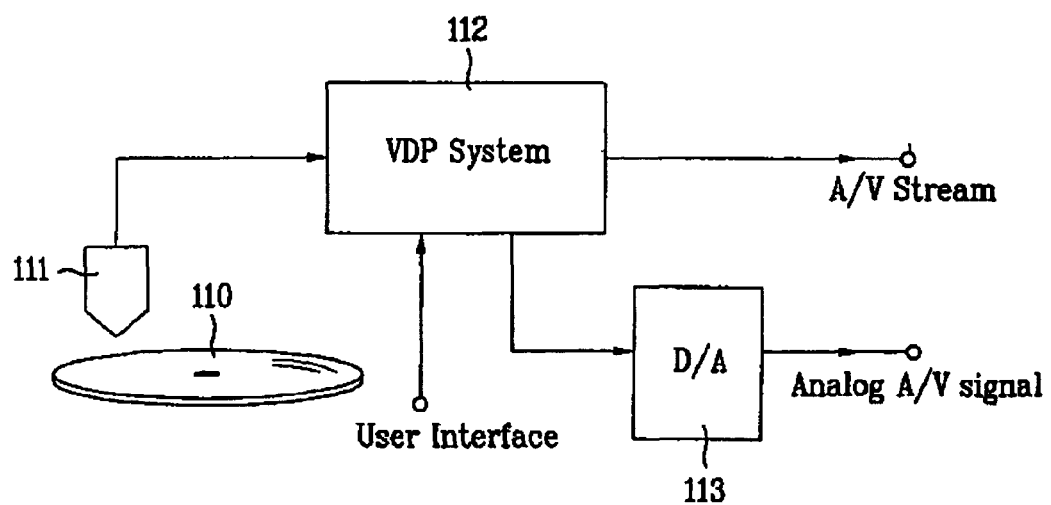
FIG. 9 illustrates a schematic diagram of a partial structure of an optical disc apparatus where the present invention is applied.

FIG. 9 illustrates a schematic diagram of a partial structure of an optical disc apparatus where the present invention is applied. As shown, the optical disc apparatus includes an optical pickup 111 for reproducing data from the an optical disk. A VDP (Video Disc Play) system 112 controls the reproduction operation of the optical pickup 111 and demodulates the data reproduced by the optical pickup 111. The VDP 112 produces an AV stream, which may also be fed to a D/A converter 13 to generate an analog version of the AV stream.

The VDP system 112 controls the optical pickup 111 and demodulates the reproduced data based on user input received from a user interface and the navigation and management information recorded on the optical disk in accordance with the present invention. For example, the VDP system 112 makes reference to still marks included in a playlist and an entry point map included in a clip information file as described above to reproduce a still picture file. Namely, the VDP system 112 reads out a still picture, graphic data, and subtitle data of each still picture unit according to the order of entry points (EP #1, #2, . . . ) recorded in the entry point map. Then, the VDP system 112 conducts a series of operations for reproducing slideshows, which may be reproduced for a fixed time duration according to the presentation duration information included in the still marks or reproduced in the form of skipped reproduction in units of the still picture unit corresponding to each of the still marks according to the key input of the user.

Figure 10:
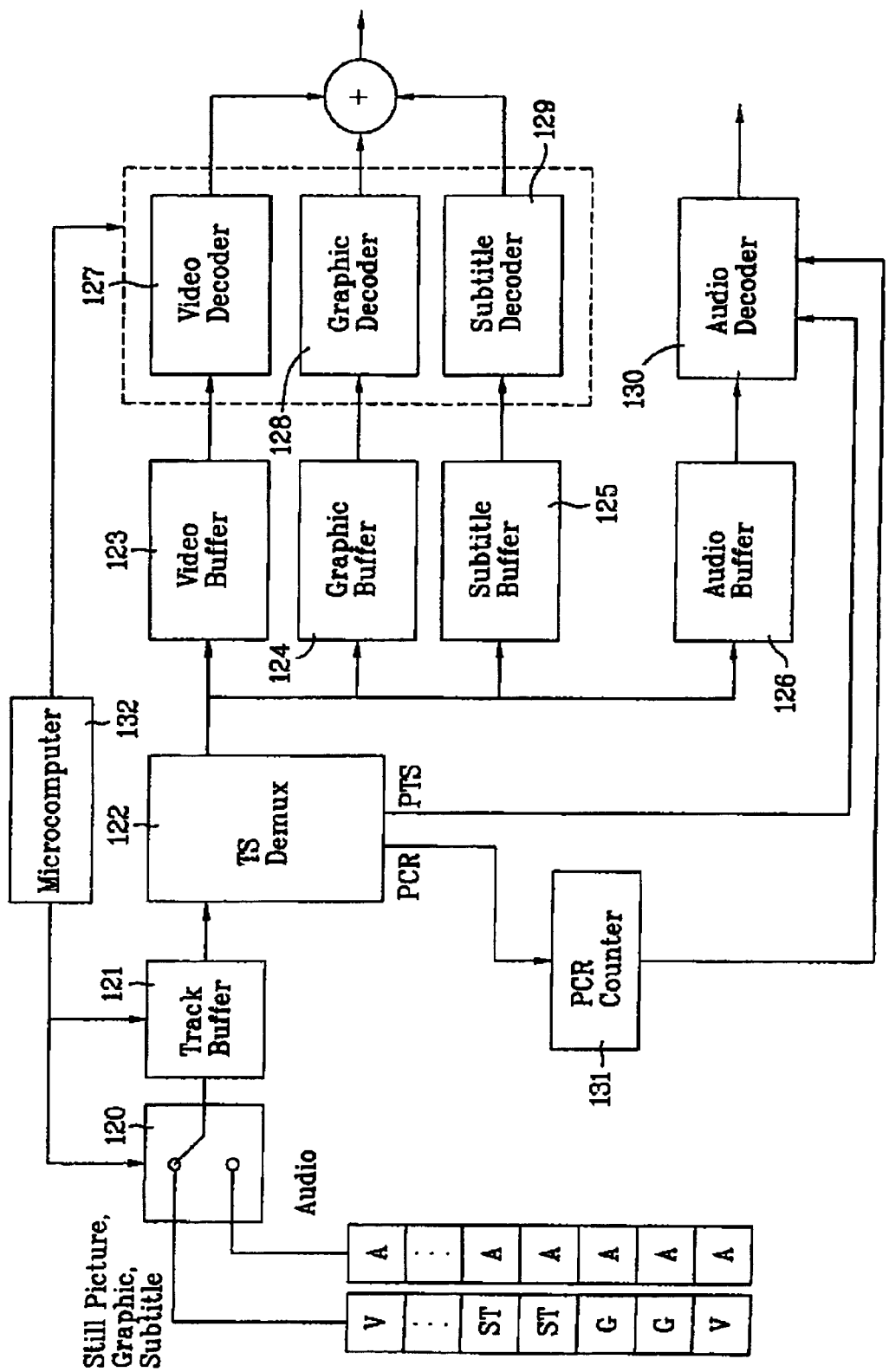
FIG. 10 illustrates a detailed structure of a first embodiment of an optical disc apparatus where the present invention is applied.

As shown in FIG. 10, the VDP system 112 may comprise a switch 120, track buffer 121, TS DEMUX 122, video buffer 123, graphic buffer 124, subtitle buffer 125, audio buffer 126, video decoder 127, graphic decoder 128, subtitle decoder 129, audio decoder 130, PCR counter 131, and microcomputer 132.

The microcomputer 132 controls the operation of the switch 120 according to the key input of a user or presentation duration information, thereby selectively feeding a still picture (V), graphic data (G), and subtitle data (ST) into the track buffer 121. The TS DEMUX 122 makes reference to the packet ID (PID) of the data stream temporarily stored in the track buffer and distributes still picture data, graphic data, and subtitle data into the video buffer 123, graphic buffer 124, and subtitle buffer 125, respectively.

The video decoder 127 decodes the still picture data, the graphic decoder 128 decodes the graphic data, and the subtitle decoder 129 decodes the subtitle data. As a result, a single still picture and related graphic and subtitle data are reproduced.

Similarly, the microcomputer 132 controls the operation of the switch 120 and selectively feeds audio data (A) read out from an optical disc into the track buffer 121. The TS DEMUX 122 makes reference to the packet ID (PID) of the audio data stream temporarily stored in the track buffer, thereby separating the audio data into the audio buffer 126.

The audio decoder 130 decodes and outputs the decoded audio data. At this stage, the presentation time stamp (PTS) information separated by the TS DEMUX 121 is fed into the audio decoder 130. Also, the PCR counter 131 counts a program clock reference (PCR) information separated from the TS DEMUX 121 and the PCR count value is fed into the audio decoder 130. Because the use of PTSs and PCRs is well-known in the art, their inclusion in the data recorded on the optical disk has not been described in detail.

The audio decoder 130 reproduces the audio data when the PCR count value coincides with the PTS value. The PCR count value and PTS value are fed only into the audio decoder 130, thereby controlling the time of audio reproduction.

Accordingly, the optical disc apparatus, by making common use of the switch 120, track buffer 121, and TS DEMUX 122, can normally conduct slideshow operations of reproducing a still picture file and audio file recorded separately in a read-only Blu-ray disc in association with each other.

Figure 11:
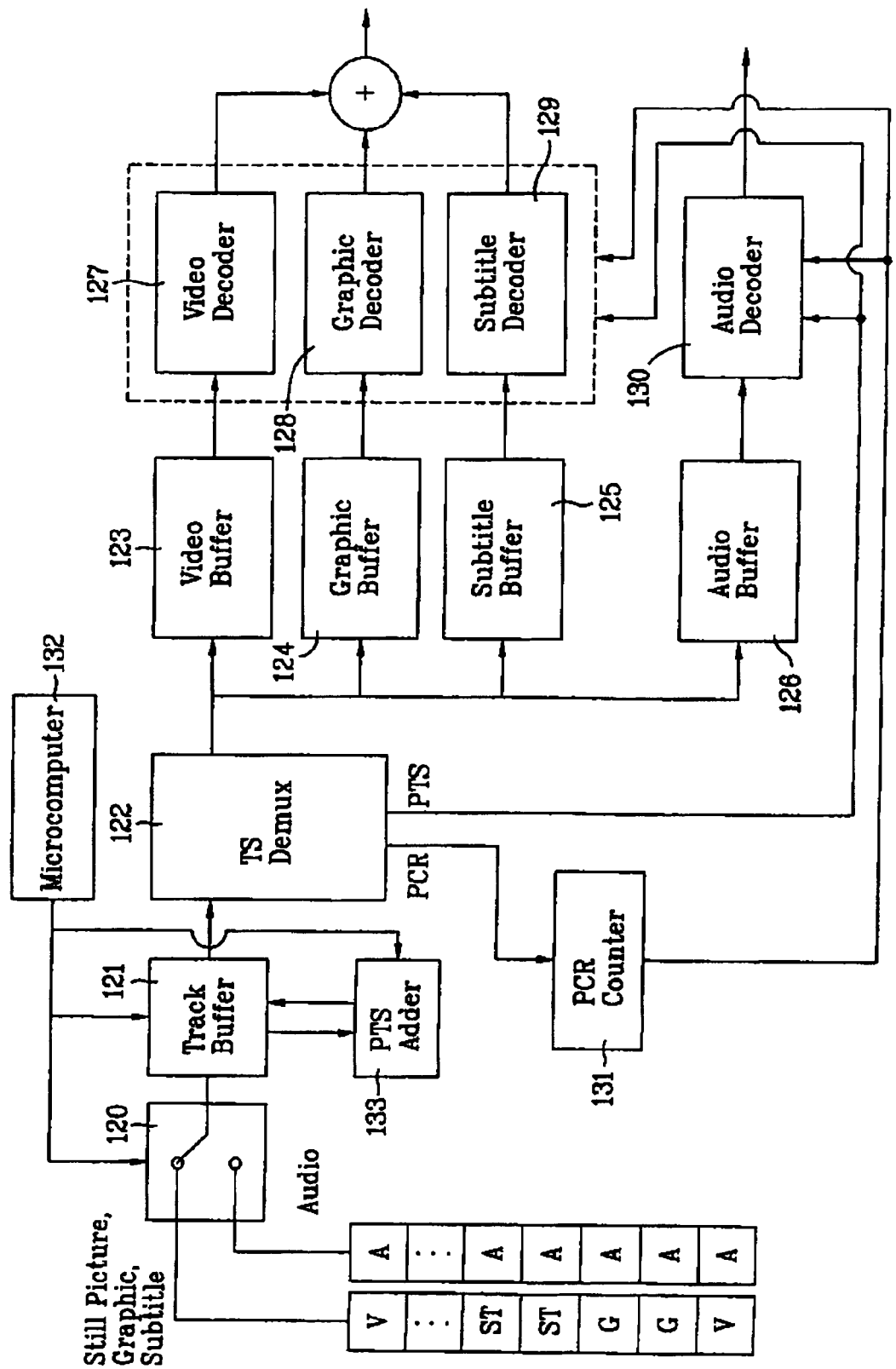
FIG. 11 is a detailed structure of a second embodiment of an optical disc apparatus where the present invention is applied.

FIG. 11 illustrates another detailed embodiment of the VDP system 112. This embodiment is the same as the embodiment of FIG. 10 except for further including a PTS adder 133 and associated connections thereto. As described above, the microcomputer 132 makes reference to the key input of the user or presentation duration information, and thus controls the operations of the track buffer 121 and the switch 120. This same information is used for control of the PTS adder 133.

The PTS adder 133 makes reference to the PTS of the audio data stored temporarily in the track buffer and thus additionally records a pseudo PTS, which is the same as the audio PTS, into the PES packets of the still picture data, graphic data, and subtitle data.

The audio PTS separated from the TS DEMUX 121 is routed to the audio decoder 130, and program clock reference (PCR) information separated from said TS DEMUX is counted by said PCR counter 131. The PCR count value is fed into audio decoder 130, and the audio decoder 130 reproduces the audio data when the PCR count value coincides with the PTS.

The pseudo PTS separated by the TS DEMUX 121 and the PCR count value are also distributed to the video decoder 127, graphic decoder 128, and subtitle decoder 129. When the PCR count value coincides with the pseudo PTS, the still picture data, graphic data, and subtitle data, are respectively reproduced.

Accordingly, the optical disc apparatus, by making common use of the switch 120, track buffer 121, and TS DEMUX 122, can normally conduct slideshow operations of reproducing a still picture file and audio file recorded separately in a read-only Blu-ray disc in association with each other.

Figure 12:
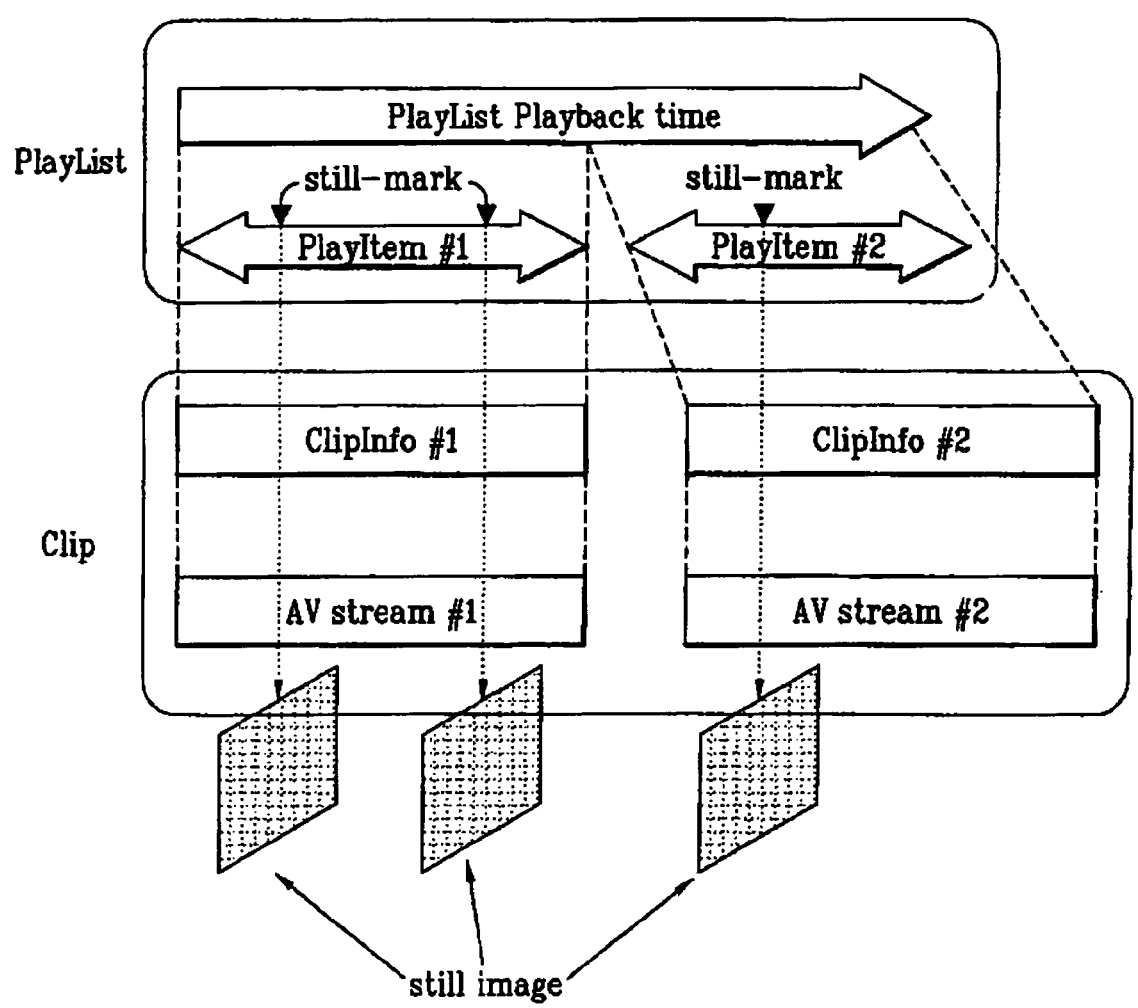
FIG. 12 illustrates another detailed embodiment of portions of the data structure in FIG. 1 and method of managing still images for a high-density recording medium.

FIG. 12 illustrates another detailed embodiment of portions of the data structure in FIG. 1 and method of managing still images for a high-density recording medium. In this embodiment, the still image is managed according to playlist mark information in a playlist. While described above with respect to the other embodiments of the invention, the use of playlist marks will be further developed in this and the remaining embodiments.

As discussed above and shown in FIG. 12, a playlist mark may be used to point to a still picture in an A/V stream clip file. This type of playlist mark is hereinafter referred to as a still mark, In general, a still image or picture may be reproduced without dependence on other images. For example, the still image is encoded as an "I-Picture" in case of an MPEG-2 stream. Accordingly, the still marks point to I pictures in the A/V stream clip file. However, a still mark is not necessarily used to point to each and every I picture.

FIG. 12 illustrates two playitems PlayItems #1 and #2 in a playlist. Each playitem provides navigation information (e.g., In-time and Out-time information) on a playing interval from clip. Namely, the first playitem PlayItem #1 provides for reproducing a first AV stream AV stream #1 in a first clip, which also includes an associated clip information file Clip-Info #1. The second playitem PlayItem #2 provides for reproducing a second AV stream AV stream #2 from a second clip, which also includes an associated clip information fie Clip- Info #2. The playlist includes playlist mark information for three still marks. Two of the still marks are associated with the first playitem in that the two still marks point to two still pictures in the same clip associated with the first playitem. The other still mark is associated with the second playitem in that this still mark points to a still picture in the same clip associated with the second playitem.

Figure 13:
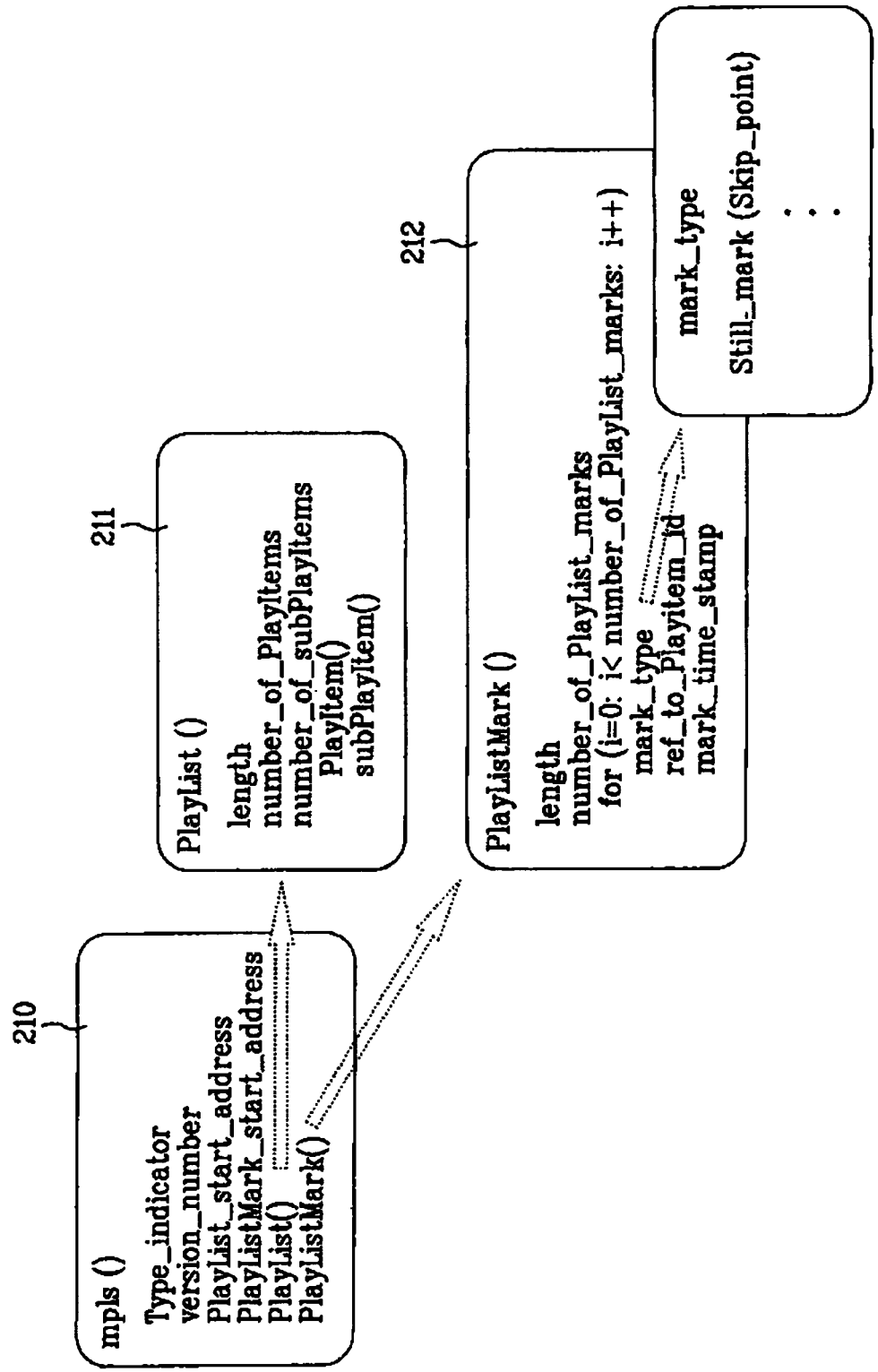
FIG. 13 illustrates an example of a portion of a playlist fie structure according to an embodiment of the present invention.

FIG. 13 illustrates an example of a portion of a playlist file structure according to an embodiment of the present invention. More specifically, FIG. 13 illustrates the structure of the playlist mark information field in the playlist file.

As shown, a playlist file PlayList file (*.mpls) 10 includes a playlist information field 211 and a playlist mark information field 212, among other fields. The playlist file also includes addresses PlayList_start_address and PlayList-Mark_start_address respectively providing the addresses of the playlist information field 210 and the playlist mark information field 212. The playlist information field 211 defines the playitems and subplayitems of the playlist.

The playlist mark information field 212 includes length information "length" indicating a byte size of the information field, and includes information "number_of_ PlayList_marks" indicating the number of the marks existing in the playlist mark information field 212. For each mark, the playlist mark information field 212 provides mark type information "mark_type" indicating the type of the mark, a playitem reference "ref_to_PlayItem_id" indicating the playitem with which the mark is associated and time stamp information "mark_times_stamp" indicating a specific reproduction time in the corresponding playitem and therefore the corresponding AV stream to which the mark points.

Returning to the mark type indicator "mark_type", at least one of the mark types is the still mark type. The still mark type indicates that that the mark is of a type used for pointing to a still picture. As has been discussed above and will be discussed in greater detail below, a mark of this type provides a point to skip to when displaying a slideshow of still pictures. Consequently, marks of this type may also be referred to as "Skip-Point" marks.

Below, two cases of still image reproduction will be described. In the first case, still images are reproduced as part of a skip operation when reproducing a movie AV stream and in the second case, still images from a still image AV stream are reproduced to provide a slideshow.

Figure 14:
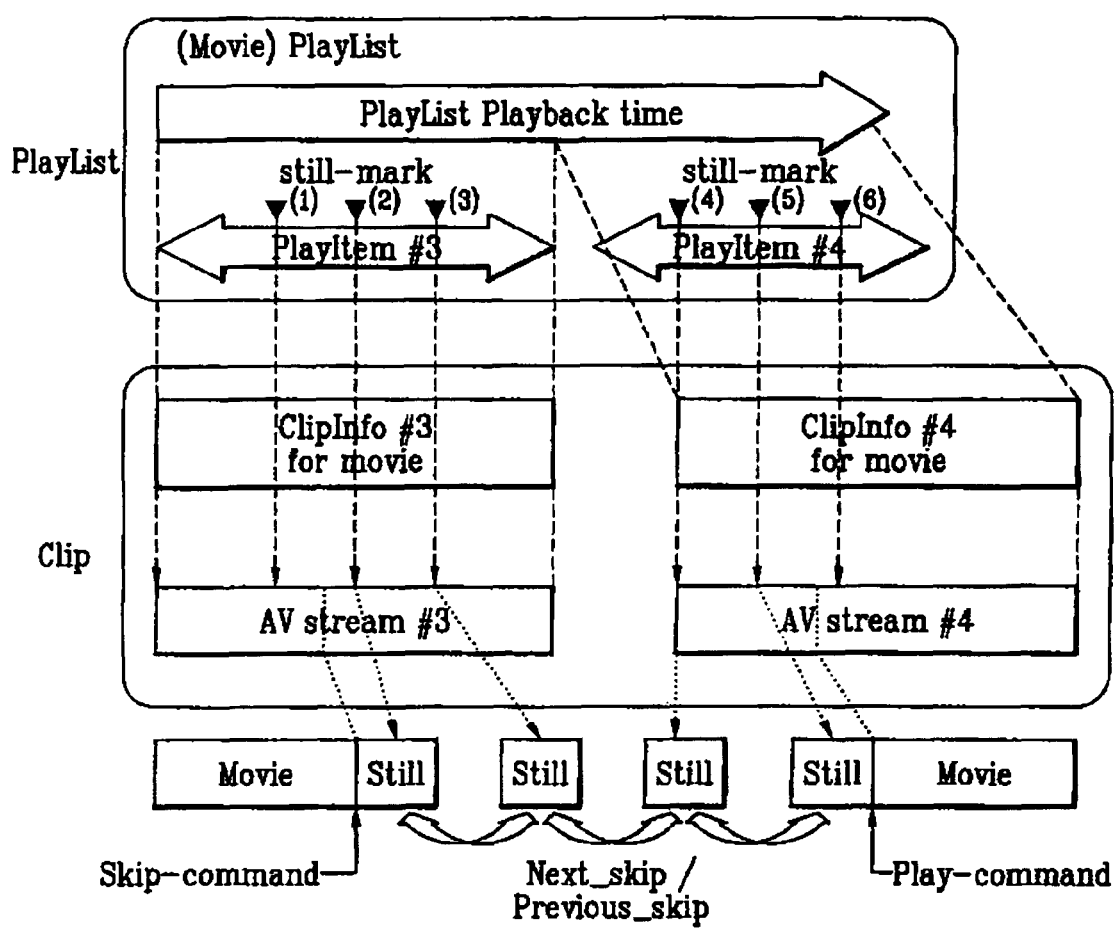
FIG. 14 illustrates an example of the data structure for managing reproduction of still images during a skip operation when reproducing a movie AV stream.

FIG. 14 illustrates an example of the data structure for managing reproduction of still images during a skip operation when reproducing a movie AV stream. As shown, a playlist includes two playitems PlayItems #3 and #4 and playlist mark information for six still marks. When the playlist is reproduced, an AV stream #3 is initially reproduced according to the navigation information provided by PlayItem #3.

This general reproduction of moving picture data is referred to as the "Movie" state. Accordingly, until a user or a system enters a skip command, the playlist is continuously reproduced in the "Movie" state. When a skip command is received, the state switches from the "Movie" state to a "Still" state. In the "Still" state, the first still picture in the A/V streams subsequent to receipt of the skip command is reproduced. For example, as shown in FIG. 14, if the skip command is generated at a time between a first still mark "still-mark (1)" and a second still mark "still-mark (2)", the still image associated with the second still mark is reproduced. The still picture may be reproduced for a limited duration or an infinite duration. This may be indicated in the still mark information for the still mark by adding an additional field or by a predetermined relationship between the duration and the mark type.

When a limited duration is provided, expiration of the display period results in the still image indicated by the next still mark being reproduced. If an unlimited duration is provided, a next still image or previous still image as indicated by the next or previous still mark is reproduced when a user enters, for example, by key button command of skip-to-next or skip-to-previous. Operation in the "Still" then continues in this manner.

The state of reproduction may be switched from the "Still" state back to "Movie" state when a normal play command is received from the user or system.

Figure 15A:
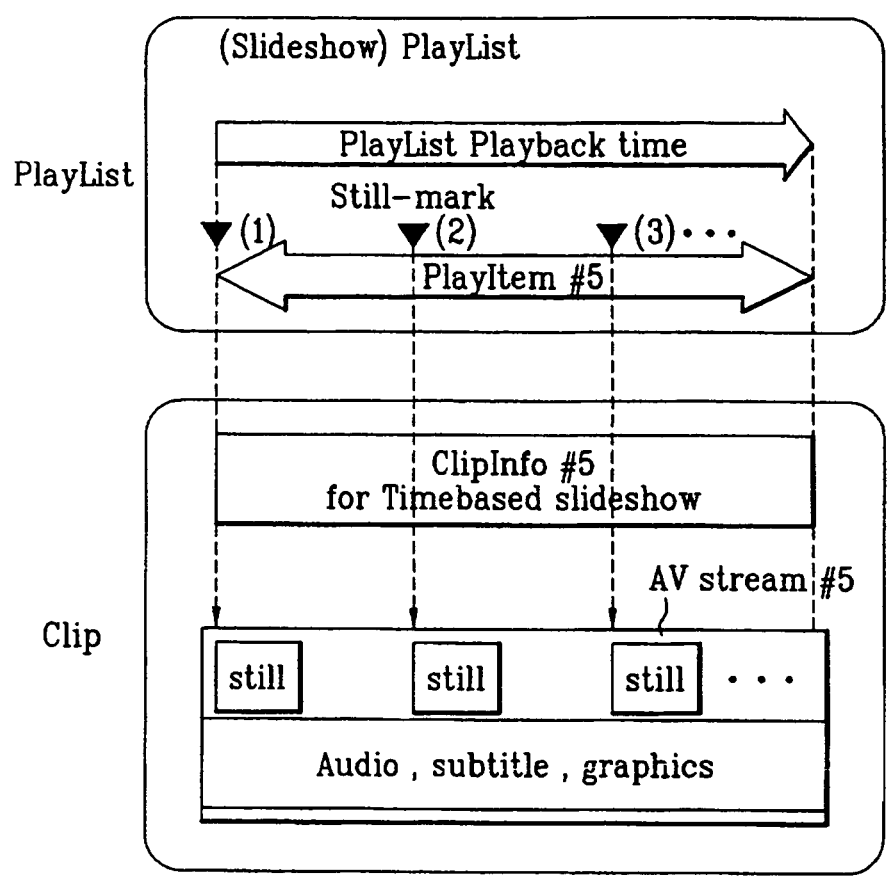
Figure 15B:
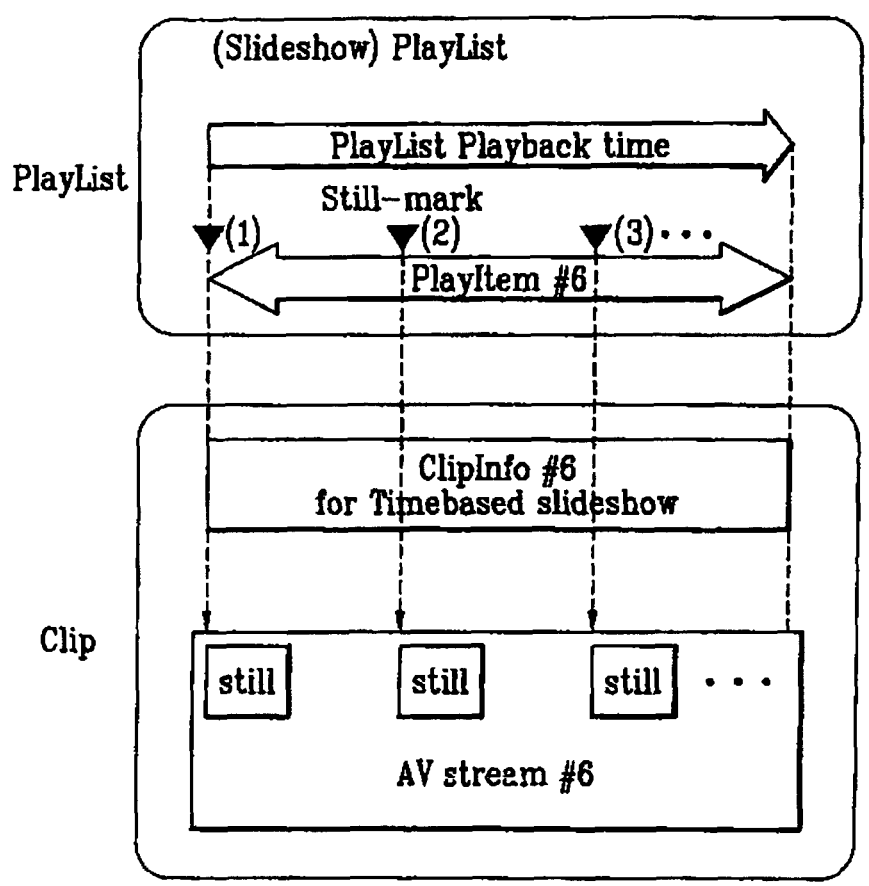

FIGS. 15A, 15B and 16 illustrate examples of the data structure for managing reproduction of still images for slideshows. In a slideshow, still images are reproduced from one or more clips possibly along with related data such as subtitle and graphic information. Here, the clips do not include movie data. Furthermore, audio data may also be reproduced in synchronization with or unsynchronized with reproduction of the still image. For synchronized reproduction of audio data, the audio data may be stored in the clip with the still images. For unsynchronized reproduction of the audio data, the audio data is reproduced from a clip that is separate from the clip with the still images.

As discussed previously, there are different types of slideshow. A time-based slideshow is slideshow in which still images are automatically and continuously reproduced with reference to a playing time. A browsable slideshow is a slideshow in which a still screen (i.e., a still picture and possibly, related data such as subtitle and graphic information) is reproduced until user input is received to proceed to a previous or next still image. The browsable slideshow is usually used when a "menu" screen is configured. Until the user selects a specific item of the "menu", a menu selection screen (that is, a still screen) is continuously reproduced. Generally, audio data is continuously reproduced as background sound. Accordingly, the audio data in the browsable slideshow is independently reproduced out of synchronization with the still screen. Time based and browsable slideshows will be described in more detail below with respect to FIGS. 6A, 6B and 7.

FIGS. 15A and 15B illustrate examples of a time-based slideshow. In FIGS. 15A and 15B, a clip for a time-based slideshow is provided separately from movie data clips. FIG. 15A illustrates an example where the AV stream file for the slideshow includes still images and associated data (e.g., audio, subtitle graphic, etc.). FIG. 15B illustrates an example where an AV stream file for the slideshow includes only still images.

Referring to FIG. 15A, the playlist includes one playitem PlayItem #5 and playlist mark information for a plurality of still marks. The still marks point to respect still pictures in the clip. The clip managed by the PlayItem #5 includes clip information file ClipInfo #5 indicating an AV stream #5 includes a time-based slideshow. The AV stream #5 includes the still images and other data associated with each still image. In this example, the other data includes audio, subtitle and graphic data. A still image and the other data associated therewith constitutes one still screen.

In the time-based slideshow, the still screens are automatically and sequentially reproduced at the times indicated by the associated still marks when the playlist is reproduced.

FIG. 15B illustrates that the AV stream for the time-based slideshow includes only the still image. Since the embodiment of FIG. 15B is the same as the embodiment of FIG. 15A except for lacking the other data, a detailed description thereof will not be repeated for the sake of brevity.

FIG. 16 illustrates an example of a browsable slideshow. As shown, a playlist provides for play back of a Clip #7 as indicated by a playitem PlayItem #7 concurrently with play back of Clip #8 as indicated by a sub-playitem SubPlayItem #8. The playitem PlayItem #7 provides navigation information (e.g., In-time and Out-time) for reproducing data from the Clip #7, which includes a clip information file ClipInfo #7 and an AV stream #7. The clip information file ClipInfo #7 indicates the associated AV stream #7 includes data for a browsable slideshow.

The AV stream #7 includes three still images and related data (e.g., subtitle and graphic information) associated with each still image. As discussed above, a still image and the associated subtitle and graphic information constitute one still screen referred to as a still picture unit or browsing unit. Therefore, the AV stream #7 includes three browsing units.

The sub-playitem SubPlayItem #8 provides navigation information (e.g., In-time and Out-time) for reproducing data from the Clip #8, which includes a clip information file Clip-Info #8 and an AV stream #8. The clip information file Clip-Info #8 indicates the associated AV stream #8 includes audio data for a browsable slideshow, and the AV stream #8 includes the audio data.

When reproduced, the browsable sideshow begins with reproduction of the browsing unit 1 specified by a first still mark and the audio data in the AV stream #8. Further operation is determined by interaction with the user. If the user does not select to move to a next or previous still image, the first still screen ("browsing unit") is continuously reproduced. However, if a skip next command is entered, then reproduction of the second still screen (second browsing unit) as specified by the second still mark begins. This operation does not affect reproduction of the audio data, which is independently and continuously reproduced until the user chooses to stop the browsable slideshow. The user controls whether reproduction of the next or previous browsing unit takes place and when by, for example, key button input of a skip-to-next or skip-to-previous command.

Figure 17:
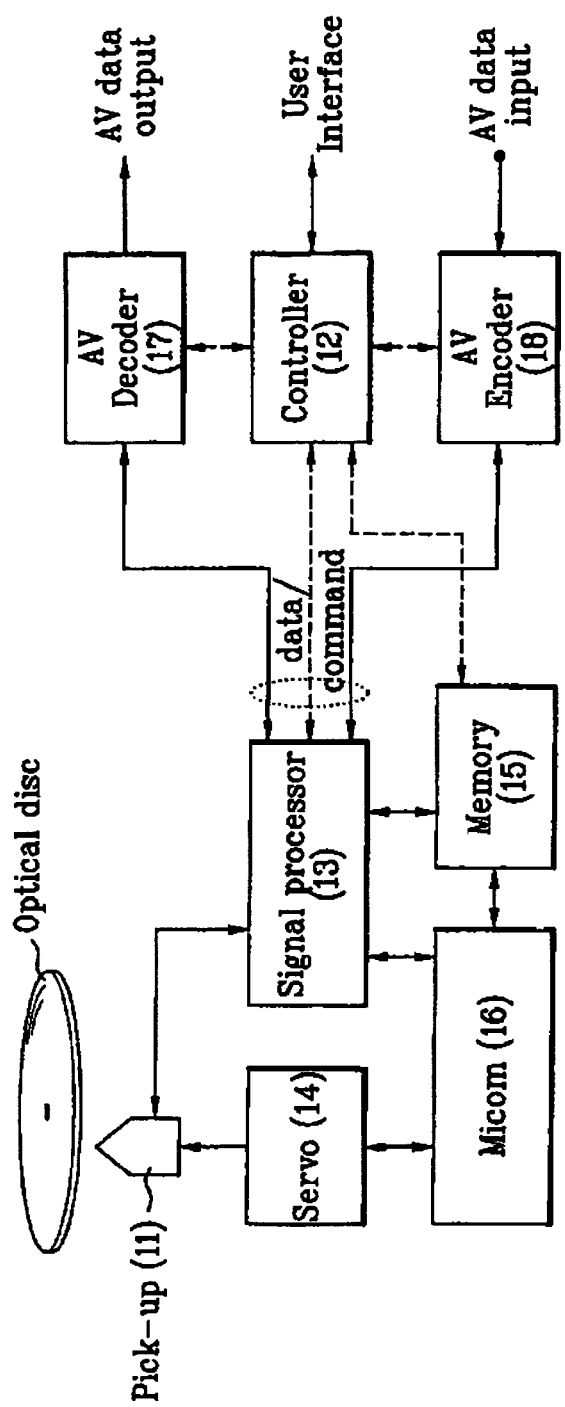
FIG. 17 illustrates an optical disc recording and reproducing apparatus according to another embodiment of the present invention.

FIG. 17 illustrates an optical disc recording and reproducing apparatus according to another embodiment of the present invention. As shown, an AV encoder 18 receives and encodes data (e.g., still image data, audio data, etc.). A signal processor 13 modulates the encoded data in accordance with the audio/video format of the optical disk. As shown in FIG. 17, the operations of the AV encoder 18 and the signal processor 13 are controlled by a controller 12. The controller 12 receives user input on the recording operation, and provides control information to AV encoder 18 and the signal processor 13. The controller 12 further controls operation of a microcomputer 16. The microcomputer 16 is directly responsible for controlling a servo 14 for an optical pick-up 11 and the output of data from the signal processor 13 to the optical pick-up 11 during a recording operation.

The controller 12 also creates the navigation and management information for managing reproduction of the data being recorded on the optical disk. For example, based on information received via the user interface (e.g., instruction set saved on disk, provided over an intranet or internet by a computer system, etc.) the controller 12 controls the recording of one or more of the data structures of the present invention on the optical disk.

During reproduction, the controller 12 controls reproduction of this data structure. Based on the information contained therein, as well as user input received over the user interface (e.g., control buttons on the recording and reproducing apparatus or a remote associated with the apparatus), the controller 12 controls the reproduction of data from the optical disk. For example, as discussed above with respect to the embodiments of the present invention, a still image or still images may be reproduced in association with audio data based on the navigation information. Furthermore, an image or group of images may be reproduced as a slideshow or portion of a slideshow. As also discussed, a slideshow may be time based, browsable, etc.

The signal processor 13 demodulates the reproduced data. The AV data is sent to an AV decoder 17, which decodes the encoded data to produce the original data that was feed to the AV encoder 18. The navigation and management data is sent to the controller 12. During both the recording and reproducing operations, the microcomputer 16, signal processor 13 and the controller 12 may store data in a memory 15.

While FIG. 17 has been described as a recording and reproducing apparatus, it will be understood that only a recording or only a reproducing apparatus may be provided using those portions of FIG. 17 providing the recording or reproducing function.

As will be appreciated from the forgoing disclosure, the present invention provides a recording medium having a data structure for managing still images recorded on a high-density recording medium (e.g., a high-density optical disk such as a BD-ROM). For example, the data structure allows for displaying still images and possibly audio data in various ways.

The method of managing still images for a high-density recording medium in accordance with the invention provides various still control operations and allows effective linked reproduction of still images along with associated subtitle data or graphic images.

As apparent from the above description, the present invention provides methods and apparatuses for recording a data structure on a high density recording medium for managing still images recorded on the recording medium.

The above description further provides methods and apparatus for reproducing still images recorded on a high density recording medium based on a data structure, also recorded on the high density recording medium, for managing the reproduction of still images.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. A non-transitory recording medium storing an executable data structure for managing reproduction of a slideshow including at least one still picture by a reproducing apparatus, the recording medium comprising:

a data area storing a first clip stream file and a second clip stream file, the first clip stream file including video data for reproducing the slideshow, the second clip stream file including audio data, the first clip stream file not including audio data; and a playlist area storing at least one playlist file, the playlist file including at least one playitem, at least one sub-playitem and a playback type indicator, the playitem indicating an in-point and an out-point of the first clip stream file for reproducing the slideshow, the sub-playitem indicating an in-point and an out-point of the second clip stream file for reproducing the audio data, the audio data configured to be reproduced independently and asynchronously from the slideshow, the slideshow configured to be reproduced without reproduction of the audio data, the playback type indicator indicating a type of playback for the at least one playitem, the type of playback for the at least one playitem being at least one of sequential playback, random playback and shuffle playback, wherein the playlist includes mark information for at least one mark, the mark pointing to one of the still pictures of the slideshow and used for skipping between the still pictures.

2. The non-transitory recording medium of claim 1, wherein the playitem includes first duration information indicating whether to display the at least one still picture of the slideshow for one of a finite and an infinite period of time, and the playitem includes second duration information indicating a length of time to display the at least one still picture of the slideshow if the first duration information indicates to display the at least one still picture of the slideshow for the finite period of time.

3. The non-transitory recording medium of claim 1, wherein the still picture of the slideshow that the mark points to is reproduced for an indefinite duration of time.

4. The non-transitory recording medium of claim 1, wherein the mark information includes a playitem indicator indicating a playitem in the playlist on which the mark is placed.

5. The non-transitory recording medium of claim 1, wherein the mark information includes a time stamp indicating a time address of the still picture of the slideshow to which the mark points.

6. A method of reproducing a data structure for managing reproduction of a slideshow including at least one still picture recorded on a recording medium, the method comprising:

reproducing at least one playlist file, the playlist file including at least one playitem, at least one sub-playitem and a playback type indicator, the playitem indicating an in-point and an out-point of a first clip stream file for reproducing the slideshow, the sub-playitem indicating an in-point and an out-point of a second clip stream file for reproducing audio data, the audio data configured to be reproduced independently and asynchronously from the slideshow, the slideshow configured to be reproduced without reproduction of the audio data, the second clip stream file not including the audio data, the playback type indicator indicating a type of playback for the at least one playitem, the type of playback for the at least one playitem being at least one of sequential playback, random playback and shuffle playback, wherein the playlist includes mark information for at least one mark, the mark pointing to one of the still pictures of the slideshow and used for skipping between the still pictures.

7. The method of claim 6, wherein the playitem includes first duration information indicating whether to display the at least one still picture of the slideshow for one of a finite and an infinite period of time, and the playitem includes second duration information indicating a length of time to display the at least one still picture of the slideshow if the first duration information indicates to display the at least one still picture of the slideshow for the finite period of time.

8. The method of claim 6, wherein the still picture of the slideshow that the mark points to is reproduced for an indefinite duration of time.

9. The method of claim 6, wherein the mark information includes a playitem indicator indicating a playitem in the playlist on which the mark is placed.

10. The method of claim 6, wherein the mark information includes a time stamp indicating a time address of the still picture of the slideshow to which the mark points.

11. An apparatus for reproducing a data structure for managing reproduction of a slideshow including at least one still picture recorded on a recording medium, the apparatus comprising:

a pick up configured to reproduce a data from the recording medium; and a controller configured to control the pick up to reproduce at least one playlist file, the playlist file including at least one playitem, at least one sub-playitem and a playback type indicator, the playitem indicating an in-point and an out-point of a first clip stream file for reproducing the slideshow, the sub-playitem indicating an in-point and an out-point of a second clip stream file for reproducing audio data, the audio data configured to be reproduced independently and asynchronously from the slideshow, the slideshow configured to be reproduced without reproduction of the audio data, the second clip stream file not including audio data, the playback type indicator indicating a type of playback for the at least one playitem, the type of playback for the at least one playitem being at least one of sequential playback, random playback and shuffle playback, and wherein the playlist includes mark information for at least one mark, the mark pointing to one of the still pictures of the slideshow and used for skipping between the still pictures.

12. The apparatus of claim 11, wherein the playitem includes first duration information indicating whether to display the at least one still picture of the slideshow for one of a finite and an infinite period of time, and the playitem includes second duration information indicating a length of time to display the at least one still picture of the slideshow if the first duration information indicates to display the at least one still picture of the slideshow for the finite period of time.

13. The apparatus medium of claim 11, wherein the still picture of the slideshow that the mark points to is reproduced for an indefinite duration of time.

14. The apparatus of claim 11, wherein the mark information includes a playitem indicator indicating .a playitem in the playlist on which the mark is placed.

15. The apparatus of claim 11, wherein the mark information includes a time stamp indicating a time address of the still picture of the slideshow to which the mark points.

16. A method of recording a data structure for managing reproduction of a slideshow including at least one still picture on a recording medium, the method comprising;

recording a first clip stream file and a second clip stream file, the first clip stream file including video data for reproducing the slideshow, the second clip stream file including audio data, the first clip stream file not including audio data;

recording at least one playlist file, the playlist file including at least one playitem, at least one sub-playitem and a playback type indicator, the playitem indicating an in-point and an out-point of the first clip stream file for reproducing the slideshow, the sub-playitem indicating an in-point and an out-point of the second clip stream file for reproducing the audio data, the audio data configured to be reproduced independently and asynchronously from the slideshow, the slideshow configured to be reproduced without reproduction of the audio data, the playback type indicator indicating a type of playback for the at least one playitem, the type of playback for the at least one playitem being at least one of sequential playback, random playback and shuffle playback wherein the playlist includes mark information for at least one mark, the mark pointing to one of the still pictures of the slideshow and used for skipping between the still pictures.

17. The method of claim 16, wherein the playitem includes first duration information indicating whether to display the at least one still picture of the slideshow for one of a finite and an infinite period of time, and the playitem includes second duration information indicating a length of time to display the at least one still picture of the slideshow if the first duration information indicates to display the at least one still picture of the slideshow for the finite period of time.

18. The method of claim 16, wherein the still picture of the slideshow that the mark points to is reproduced for an indefinite duration of time.

19. The method of claim 16, wherein the mark information includes a playitem indicator indicating a playitem in the playlist on which the mark is placed.

20. The method of claim 16, wherein the mark information includes a time stamp indicating a time address of the still picture of the slideshow to which the mark points.

21. An apparatus for recording a data structure for managing reproduction of a slideshow including at least one still picture on a recording medium, the apparatus comprising;

a pick up configured to record data on the recording medium; and a controller configured to control the pick up to record a first clip stream file and a second clip stream file on the recording medium, the first clip stream file including video data for reproducing the slideshow, the second clip stream file including audio data, the first clip stream file not including audio data, the controller configured to control the pick up to record at least one playlist file, the playlist file including at least one playitem, at least one sub-playitem and a playback type indicator, the playitem indicating an in-point and an out-point of the first clip stream file for reproducing the slideshow, the sub-playitem indicating an in-point and an out-point of the second clip stream file for reproducing the audio data, the audio data configured to being reproduced independently and asynchronously from the slideshow, the slideshow configured to be reproduced without reproduction of the audio data, the playback type indicator indicating a type of playback for the at least one playitem, the type of playback for the at least one playitem being at least one of sequential playback, random playback and shuffle playback, and wherein the playlist includes mark information for at least one mark, the mark pointing to one of the still pictures of the slideshow and used for skipping between the still pictures.

22. The apparatus of claim 21, wherein the playitem includes first duration information indicating whether to display the at least one still picture of the slideshow for one of a finite and an infinite period of time, and the playitem includes second duration information indicating a length of time to display the at least one still picture of the slideshow if the first duration information indicates to display the at least one still picture of the slideshow for the finite period of time.

23. The apparatus of claim 21, wherein the still picture of the slideshow that the mark points to is reproduced for an indefinite duration of time.

24. The apparatus of claim 21, wherein the mark information includes a playitem indicator indicating a playitem in the playlist on which the mark is placed.

25. The apparatus of claim 21, wherein the mark information includes a time stamp indicating a time address of the still picture of the slideshow to which the mark points.

* * * * *